(12) United States Patent
Kennedy et al.

(10) Patent No.: US 10,301,421 B2
(45) Date of Patent: May 28, 2019

(54) SYNTHESIS OF -S—CH₂CH₂—OH TELECHELIC POLYISOBUTYLENES AND THEIR USE FOR THE PREPARATION OF BIOSTABLE POLYURETHANES

(71) Applicants: Joseph Kennedy, Akron, OH (US); Kalman Toth, Cuyahoga Falls, OH (US); Nihan Nugay, Istanbul (TR); Turgut Nugay, Istanbul (TR)

(72) Inventors: Joseph Kennedy, Akron, OH (US); Kalman Toth, Cuyahoga Falls, OH (US); Nihan Nugay, Istanbul (TR); Turgut Nugay, Istanbul (TR)

(73) Assignee: THE UNIVERSITY OF AKRON, Akron, OH (US)

( * ) Notice: Subject to any disclaimer, the term of this patent is extended or adjusted under 35 U.S.C. 154(b) by 114 days.

(21) Appl. No.: 15/504,492

(22) PCT Filed: Aug. 26, 2015

(86) PCT No.: PCT/US2015/046898
§ 371 (c)(1),
(2) Date: Feb. 16, 2017

(87) PCT Pub. No.: WO2016/033158
PCT Pub. Date: Mar. 3, 2016

(65) Prior Publication Data
US 2017/0260318 A1 Sep. 14, 2017

Related U.S. Application Data

(60) Provisional application No. 62/041,693, filed on Aug. 26, 2014.

(51) Int. Cl.
| | | |
|---|---|---|
| C08G 18/62 | (2006.01) |
| C08G 18/76 | (2006.01) |
| C08G 18/75 | (2006.01) |
| C08F 110/10 | (2006.01) |
| C08F 8/34 | (2006.01) |
| C08G 75/045 | (2016.01) |
| C08G 75/04 | (2016.01) |
| C08F 2/38 | (2006.01) |
| C08G 18/24 | (2006.01) |

(52) U.S. Cl.
CPC ............ *C08G 18/6204* (2013.01); *C08F 2/38* (2013.01); *C08F 8/34* (2013.01); *C08F 110/10* (2013.01); *C08G 18/246* (2013.01); *C08G 18/758* (2013.01); *C08G 18/7671* (2013.01); *C08G 75/04* (2013.01); *C08G 75/045* (2013.01); *C08F 2810/40* (2013.01)

(58) Field of Classification Search
None
See application file for complete search history.

(56) References Cited

U.S. PATENT DOCUMENTS

| | | | |
|---|---|---|---|
| 8,552,118 B2 | 10/2013 | Kennedy et al. | |
| 8,674,034 B2 | 3/2014 | Kennedy et al. | |
| 9,359,465 B2 | 6/2016 | Kennedy et al. | |
| 9,587,067 B2 | 3/2017 | Kennedy et al. | |
| 2011/0054581 A1* | 3/2011 | Desai | A61N 1/05 607/116 |
| 2012/0259069 A1* | 10/2012 | Kennedy | C08G 18/10 525/131 |
| 2014/0204464 A1 | 7/2014 | Halverson et al. | |

FOREIGN PATENT DOCUMENTS

| | | | | |
|---|---|---|---|---|
| WO | WO-2008066914 A1 * | 6/2008 | ............ | C08F 10/10 |
| WO | WO-2010039986 A1 * | 4/2010 | ............ | C08G 18/10 |
| WO | WO-2014081916 A2 * | 5/2014 | ......... | C08G 18/6204 |

OTHER PUBLICATIONS

Magenau, et al. "Facile polyisobutylene functionalization via thiol-ene click chemistry", Polymer Chemistry, 6, 831-833, May 10, 2010. (Year: 2010).*
Boileau, et al. "Reaction of functionalised thiols with oligoisobutenes via free-radical addition. Some new routes to thermoplastic crosslinkable polymers", European Polymer Journal, 39, 1395-1404, 2003. (Year: 2003).*
Gilles Boutevin, et al., Synthesis and Use of Hydroxyl Telechelic Polybutadienes Grafted by 2-Mercaptoethanol for Polyurethane Resins; Aug. 15, 1999; pp. 1655-1666.
Andrew J.D. Magenau, et al.; Thiol-Terminated Polyisobutylene; Synthesis, Characterization, and Derivatization; pp. 5505-5513; Aug. 30, 2010.
David L. Morgan; End-Quenching of Quasi-Living Isobutylene Polymerizations with Alkoxybenzene Compounds; pp. 6844-6847; Aug. 21, 2009.

* cited by examiner

*Primary Examiner* — Christopher M Rodd
(74) *Attorney, Agent, or Firm* — Renner Kenner Greive Bobak Taylor & Weber

(57) ABSTRACT

Sulfur containing, hydroxyl-telechelic PIBs, hydrolytically and oxidatively resistant, biocompatible and biostable polyurethanes (PUs) made therefrom, and methods for making both are disclosed. Well-defined hydroxyl telechelic PIBs are synthesized by a thiol-ene click photochemical reaction between PIBs carrying unsaturated end groups and 2-mercaptoethanol (HS—CH₂CH₂—OH). This regioselective process affords HO—CH₂CH₂—S-PIB-S—CH₂CH₂—OH (abbreviated herein as HO—S-PIB-S—OH) in high yield. In some embodiments, these HO—S-PIB-S—OH polymers may be reacted with diisocyanates and a chain extender to form sulfur containing PIB-based PUs. These sulfur containing PIB-based PUs have been found to have properties and chemical stability that are very similar to that of PUs made from di-hydroxyl terminated PIBs (OH-PIB-OHs) without sulfur, but have surprisingly increased creep resistance and are easier and less expensive to make.

13 Claims, 20 Drawing Sheets

SYNTHESIS OF -S—CH$_2$CH$_2$—OH TELECHELIC POLYISOBUTYLENES AND THEIR USE FOR THE PREPARATION OF BIOSTABLE POLYURETHANES

CROSS REFERENCE TO RELATED APPLICATIONS

This application claims the benefit of U.S. provisional patent application Ser. No. 62/041,693 entitled "Synthesis of —S—CH$_2$CH$_2$—OH Telechelic Polyisobutylenes and Their Use for the Preparation of Biostable Polyurethanes," filed Aug. 26, 2014, and incorporated herein by reference in its entirety.

FIELD OF THE INVENTION

One or more embodiments of the present invention relates to sulfur containing polyisobutylenes and polyurethanes (PUs). In certain embodiments, the present invention relates to novel sulfur containing, hydroxyl-telechelic polyisobutylenes and the hydrolytically and oxidatively resistant, biocompatible and biostable PUs made therefrom, as well as methods for making both.

BACKGROUND OF THE INVENTION

Di-hydroxyl terminated polyisobutylenes (HO-PIB-OHs) are important intermediates for the synthesis of hydrolytically and oxidatively resistant biocompatible and biostable materials including, but not restricted to, polyurethanes (PUs). Methods for the preparation of HO-PIB-OH and its use for the preparation of hydrolytically-oxidatively resistant PUs are well known; however, the synthesis of HO-PIB-OH is complex and expensive, involving expensive hydroboration and purification steps. At the present the most reliable route to HO-PIB-OH involves isobutylene polymerization initiation by the bifunctional initiator tert-butyldicumyl chloride (tBudiCumCl) in conjunction with TICl$_4$, terminating the polymerization with allyltrimethylsilane to yield allyl-telechelic PIB (A-PIB-A), and converting the latter by hydroboration/oxidation to the target HO-PIB-OH. Hydroboration calls for the use of relatively expensive H$_3$B.

Heretofore, such di-hydroxyl terminated polyisobutylenes (HO-PIB-OHs) have primarily focused on obtaining compositions that place the —OH group(s) on the primary terminal carbon, as many times, the —OH groups are susceptible to being positioned on the secondary terminal carbon based upon Markovnikov's Rule, which, for hydroxyl group (OH) bonds, provides that the —OH group will bond to the carbon that has the greater number of carbon-carbon bonds, while the hydrogen bonds to the carbon on the other end of the double bond, that has more carbon-hydrogen bonds. Thus, forcing the —OH groups to bond to the primary carbon in an allyl (—CH2-CH2=CH2) or vinylidene (—CH$_2$—CH(CH$_3$)=CH$_2$) group has been accomplished only at great expense using complex anti-Markovnikov reactions.

Thus, the need exists to provide a simple and inexpensive preparation method that provides for di-hydroxyl terminated polyisobutylenes wherein the —OH groups are on the primary carbon.

SUMMERY OF THE INVENTION

In various embodiments, the present invention is directed to novel sulfur containing, hydroxyl-telechelic polyisobutylenes, the hydrolytically and oxidatively resistant, biocompatible and biostable polyurethanes (PUs) made therefrom, and simple and inexpensive methods for making both. In one or more embodiments of the present invention, well-defined hydroxyl telechelic PIBs are synthesized by a thiol-ene click photochemical reaction between PIBs carrying unsaturated (allyl) end groups and 2-mercaptoethanol (HS—CH$_2$CH$_2$—OH). In some embodiments, this regioselective process affords HO—CH$_2$CH$_2$—S-PIB-S—CH$_2$CH$_2$—OHs (abbreviated herein as HO—S-PIB-S—OH) in high yield. The C—S bond is essentially insensitive to oxygen or water. In some embodiments, these HO—S-PIB-S—OH polymers may be reacted with diisocyanates and short chain diols (called chain extenders) to form PIB-based PUs. As will be appreciated by those of skill in the art, polyurethane elastomers exhibit a two-phase morphology, wherein the hard segments form discrete domains in a matrix of soft segments. In the sulfur containing PIB-based PUs of various embodiments of the present invention, the HO—S-PIB-S—OH polymers lead to the soft segments, and diisocyanates and chain extenders produce the hard segments.

In a first aspect, embodiments of the present invention are directed to a sulfur containing, hydroxyl-telechelic polyisobutylene. In some of these embodiments, the sulfur containing, hydroxyl-telechelic polyisobutylene further comprises two or more sulfur containing, hydroxyl-telechelic polyisobutylene arms extending from a core. In one or more embodiments, the sulfur containing, hydroxyl-telechelic polyisobutylene of the present invention may include any one or more of the above referenced embodiments of the first aspect of the present invention wherein the sulfur atom is separated from a terminal hydroxyl group by two carbon atoms. In one or more embodiments, the sulfur containing, hydroxyl-telechelic polyisobutylene of the present invention may include any one or more of the above referenced embodiments of the first aspect of the present invention having a polydispersity index (PDI) of from about 1.05 to about 1.01.

In one or more embodiments, the sulfur containing, hydroxyl-telechelic polyisobutylene of the present invention may include any one or more of the above referenced embodiments of the first aspect of the present invention having the formula HO—CH$_2$CH$_2$—S-PIB-S—CH$_2$CH$_2$—OH. In one or more embodiments, the sulfur containing, hydroxyl-telechelic polyisobutylene of the present invention may include any one or more of the above referenced embodiments of the first aspect of the present invention having the formula:

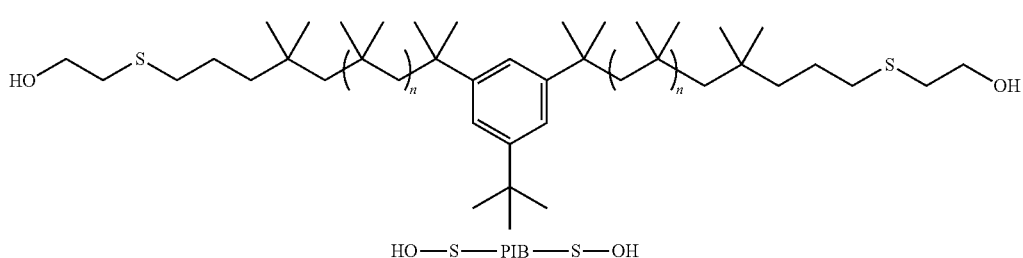

Formula I wherein n is an integer from about 2 to about 5,000. In one or more embodiments, the sulfur containing, hydroxyl-telechelic polyisobutylene of the present invention may include any one or more of the above referenced embodiments of the first aspect of the present invention wherein the S—C bonds are not susceptible to hydrolysis by adds. In one or more embodiments, the sulfur containing, hydroxyl-telechelic polyisobutylene of the present invention may include any one or more of the above referenced embodiments of the first aspect of the present invention having increased creep resistance relative to the corresponding HO-PIB-OH polymer. As used herein, a "corresponding" HO-PIB-OH or A-PIB-A polymer of a HO—S-PIB-S—OH polymer is a HO-PIB-OH or A-PIB-A polymer having identical core and PIB arms as the referenced HO—S-PIB-S—OH, but has hydroxyl end groups (HO-PIB-OH) or allyl end groups (A-PIB-A) in place of the mercapto end groups of the HO—S-PIB-S—OH.

In a second aspect, embodiments of the present invention are directed to a method of making a sulfur containing hydroxyl-telechelic polyisobutylene comprising: producing a polyisobutylene having one or more unsaturated end groups; combining the polyisobutylene with 2-mercaptoethanol and a photoinitiator; and exposing the combination to ultra-violet light to produce a sulfur containing hydroxyl-telechelic polyisobutylene.

In some of these embodiments, the step of producing further comprises: combining tert-butyl-dicumyl chloride (tBudiCumCl) bifunctional initiator with tetramethylethylenediamine (TMEDA), dichloromethane and hexane in a suitable container; adding isobutylene; adding titanium tetrachloride (TiCl$_4$) to start polymerization of the isobutylene and tBudiCumCl bifunctional initiator; adding allyltrimethylsilane to terminate polymerization; and quenching the reaction with a solution of methanol and sodium bicarbonate (NaHCO$_3$) to produce the polyisobutylene having one or more unsaturated end groups.

In a third aspect, embodiments of the present invention are directed to a sulfur containing polyurethane comprising the sulfur containing, hydroxyl-telechelic polyisobutylene of the first aspect of the invention. In some embodiments, the present invention is directed to a sulfur containing polyurethane comprising a sulfur containing, hydroxyl-telechelic polyisobutylene wherein one or more of the sulfur atoms are in the backbone of the polymer. In one or more embodiments, the sulfur containing PUs of the present invention may include any one or more of the above referenced embodiments of the third aspect of the present invention having S—C bonds in the backbone of the polymer that are not susceptible to hydrolysis by acids.

In one or more embodiments, the sulfur containing PUs of the present invention may include any one or more of the above referenced embodiments of the third aspect of the present invention further comprising one or more soft segments comprising the residue of one or more sulfur containing hydroxyl-telechelic polyisobutylene and one or more hard segments comprising a diisocyanate. In one or more embodiments, the sulfur containing PUs of the present invention may include any one or more of the above referenced embodiments of the third aspect of the present invention wherein the one or more hard segments comprises 4,4'-methylenebis(phenyl isocyanate) (MDI) or 4,4'-methylenebis(cyclohexyl isocyanate) (HMDI). In one or more embodiments, the sulfur containing PUs of the present invention may include any one or more of the above referenced embodiments of the third aspect of the present invention wherein the one or more hard segments further comprise a chain extender.

In one or more embodiments, the sulfur containing PUs of the present invention may include any one or more of the above referenced embodiments of the third aspect of the present invention wherein the residue of the one or more sulfur containing hydroxyl-telechelic PIBs comprise from about 50 weight % to about 80 weight % of the sulfur containing polyurethane. In one or more embodiments, the sulfur containing PUs of the present invention may include any one or more of the above referenced embodiments of the third aspect of the present invention having the formula:

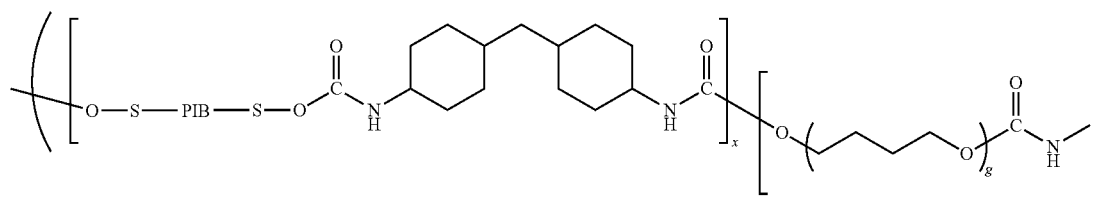

Formula II

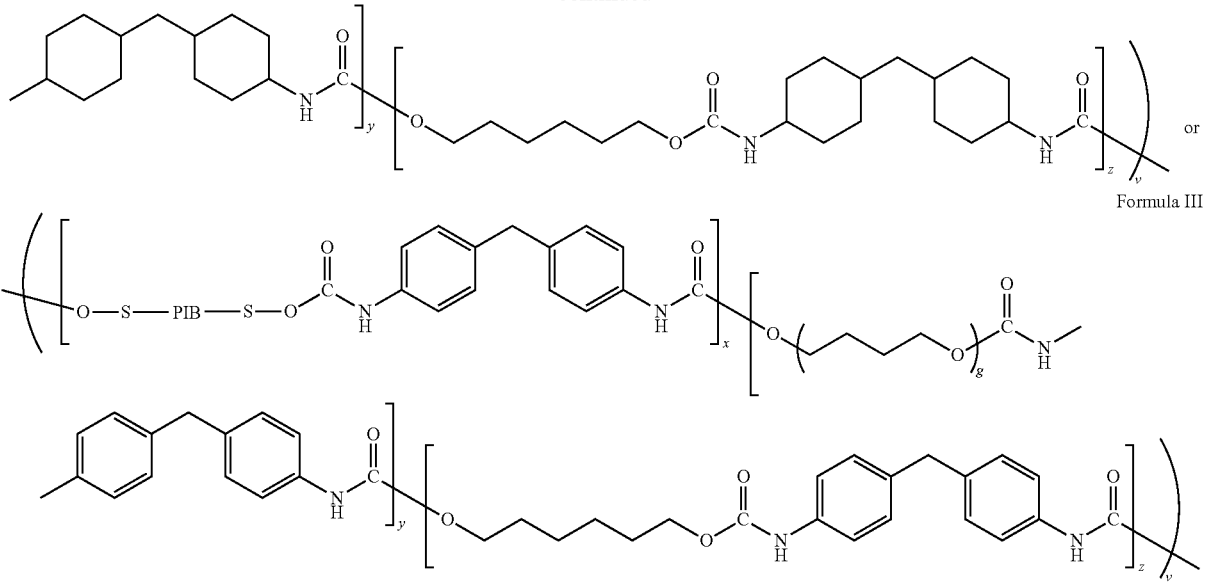

Formula III wherein x is an integer from about 5 to about 100; y is an integer from about 5 to about 100; z is an integer from about 5 to about 100; v is an integer from about 5 to about 100; and there are two additional carbon atoms between each sulfur atom bonded to the PIB chain and the adjacent oxygen atom.

In one or more embodiments, the sulfur containing PUs of the present invention may include any one or more of the above referenced embodiments of the third aspect of the present invention having a polydispersity index (PDI) of from about 3.0 to about 1.2. In one or more embodiments, the sulfur containing PUs of the present invention may include any one or more of the above referenced embodiments of the third aspect of the present invention having a tensile strength of from about 0.5 MPa to about 40 MPa. In one or more embodiments, the sulfur containing PUs of the present invention may include any one or more of the above referenced embodiments of the third aspect of the present invention having a tensile elongation of from about 50% to about 500%.

In one or more embodiments, the sulfur containing PUs of the present invention may include any one or more of the above referenced embodiments of the third aspect of the present invention having increased creep resistance relative to the corresponding $PIB_O$-PU polymer. In one or more embodiments, the sulfur containing PUs of the present invention may include any one or more of the above referenced embodiments of the third aspect of the present invention wherein the sulfur containing PU is annealed.

In a fourth aspect, embodiments of the present invention are directed to a method of making sulfur containing PUs comprising: preparing the sulfur containing hydroxyl-telechelic polyisobutylene of the first aspect of the invention as described above; combining the sulfur containing, hydroxyl-telechelic polyisobutylene, an isocyanate, and a suitable solvent, such as tetrahydrofuran (THF), in a suitable container under an inert, e.g., nitrogen, atmosphere; heating the combination to a temperature of from about 50° C. to about 70° C.; adding a catalyst; and stirring to produce a prepolymer comprising the residues of the sulfur containing hydroxyl-telechelic polyisobutylene and the isocyanate and having cyanate end groups; dissolving one or more chain extender in a suitable deoxygenated solvent and adding it to the prepolymer solution of step C; and reacting the prepolymer with the chain extender to produce a sulfur containing polyurethane. In some of these embodiments, the step of preparing comprises: producing a polyisobutylene having one or more unsaturated end groups; combining the polyisobutylene with 2-mercaptoethanol and a photoinitiator; and exposing the combination of step B to ultra-violet light to produce a sulfur containing hydroxyl-telechelic polyisobutylene.

In one or more embodiments, the method of making sulfur containing PUs of the present invention may include any one or more of the above referenced embodiments of the fourth aspect of the present invention wherein the isocyanate is 4,4'-methylenebis(phenyl isocyanate) (MDI), 4,4'-methylenebis(cyclohexyl isocyanate) (HMDI), or other conventional isocyanate known to the art" or combinations thereof. In one or more embodiments, the method of making sulfur containing PUs of the present invention may include any one or more of the above referenced embodiments of the fourth aspect of the present invention wherein the catalyst comprises dibutyltin dilaurate or any other catalyst known to the art for that purpose. In one or more embodiments, the method of making sulfur containing PUs of the present invention may include any one or more of the above referenced embodiments of the fourth aspect of the present invention wherein the chain extender comprises hexamethylene diol (HD), poly(tetrahydrofuran) (BG9), butane diol or other conventional diols known to the art or combinations thereof.

BRIEF DESCRIPTION OF THE DRAWINGS

For a more complete understanding of the features and advantages of the present invention, reference is now made to the detailed description of the invention along with the accompanying figures in which.

DETAILED DESCRIPTION OF THE ILLUSTRATIVE EMBODIMENTS

Figure 1:
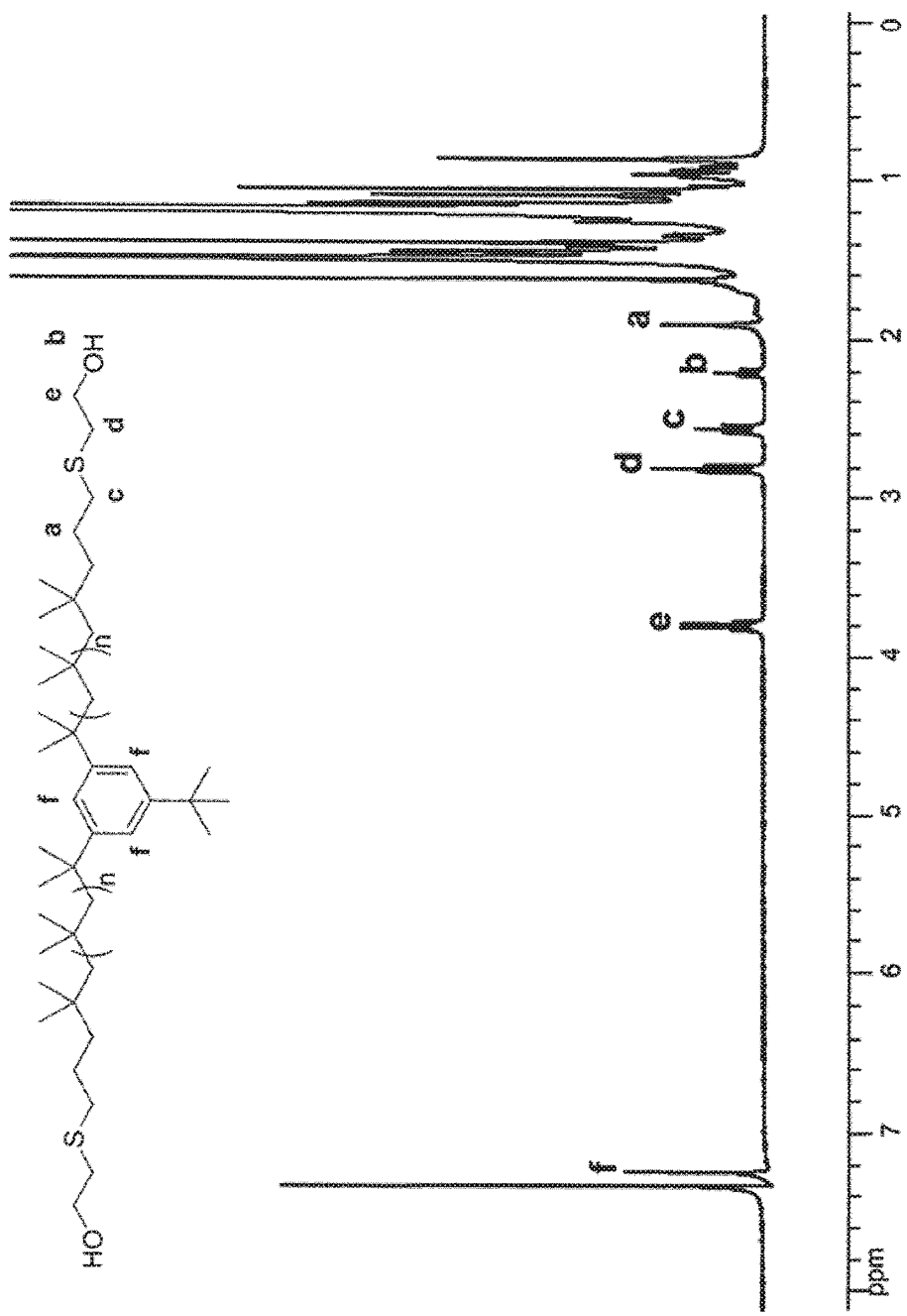
FIG. 1 is a $^1$H-NMR spectrum of HO—S-PIB-S—OH (in $CDCl_3$) together with assignments.

In various embodiments, the present invention is directed to novel sulfur containing, hydroxyl-telechelic PIBs, the hydrolytically and oxidatively resistant, biocompatible and biostable PUs (PUs) made therefrom, and simple and inexpensive methods for making both. Well-defined hydroxyl telechelic PIBs are synthesized by a thiol-ene click photochemical reaction between PIBs carrying unsaturated end groups and 2-mercaptoethanol (HS—CH$_2$CH$_2$—OH). This regioselective process affords HO—CH$_2$CH$_2$—S-PIB-S—CH$_2$CH$_2$—OH (abbreviated herein as HO—S-PIB-S—OH) in high yield. The C—S bond is highly insensitive to oxygen or water. In some embodiments, these HO—S-PIB-S—OH polymers may be reacted with diisocyanates and a chain extender, such as a short chain diol, to form PIB-based PUs. As will be appreciated by those of skill in the art, polyurethane elastomers exhibit a two-phase morphology, wherein the hard segments form discrete domains in a matrix of soft segments. In the sulfur containing, PIB-based PUs of embodiments of the present invention, the HO—S-PIB-S—OH polymers lead to the soft segments, and diisocyanates and chain extenders produce the hard segments.

It will be appreciate that, in alternative embodiments, other HO—S-PIB-S—OH polymers may be prepared using compositions having one to eight carbon atoms between the —SH and —OH groups substituted for the 2-mercaptoethanol. If used, then the HO—S-PIB-S—OH polymers will have a corresponding number of carbon atoms (i.e., one to eight) between the S and —OH in the resultant polymers. Nevertheless, this application has maintained the use of 2-mercaptoethanol and only 2 carbon atoms between the S and the —OH group for consistency in this disclosure. Those embodiments of HO—S-PIB-S—OH polymers with more the two carbon atoms between the S and —OH groups may have issues in their production or have differing biostability and mechanical properties, but theoretically could be prepared. Their polydispersity indexes could change as well.

In a first aspect, embodiments of the present invention are directed to novel sulfur containing, hydroxyl-telechelic PIBs. In some embodiments, these HO—S-PIB-S—OH polymers have two or more sulfur containing, hydroxyl-telechelic polyisobutylene arms extending from a core. PIB star polymers are generally well known in the art, and the composition of the core from which the PIB arms extend is not particularly limited, but may include, without limitation and for example only, the residue of a tBudiCumCl bifunctional initiator. In some embodiments, the core comprises the residue of the initiator used for the synthesis of PIB. In some embodiments, the core comprises the residue of a tBudiCumCl bifunctional initiator used to synthesize the PIB.

It will be appreciated that while the novel sulfur containing, hydroxyl-telechelic PIBs of the present invention are abbreviated herein for convenience as HO—S-PIB-S—OH, this designation is intended as shorthand for the sulfur containing, hydroxyl-telechelic PIBs of the present invention in general, and not as a formula. It is not, for example, intended to limit the sulfur containing, hydroxyl-telechelic PIBs of the present invention to embodiments having two sulfur containing, hydroxyl-telechelic arms, and may refer to embodiments having three or more arms. Similarly, the HO—S-PIB-S—OH abbreviation does not show the $CH_2CH_2$ groups between the sulfur and hydroxyl groups or the core of the PIB. (See Formula I above). It should, nevertheless, be understood that these items are present in the PIBs and PUs of various embodiments of the present invention. (See, e.g., Formulas II and III above)

As set forth above, the HO—S-PIB-S—OH polymers of the present invention will have two or more sulfur containing, hydroxyl-telechelic polyisobutylene arms extending from a core. In some embodiments, these HO—S-PIB-S—OH polymers may have from 2, 3, 4 or 5 arms extending from the core. In some embodiments, these HO—S-PIB-S—OH polymers may have from 2 to 6 arms extending from the core. In some embodiments, these HO—S-PIB-S—OH polymers may have two arms extending from the core.

Each of these arms will further comprise a polyisobutylene (PIB) chain having from about 3 to about 5,000 isobutylene units or residues. As used herein, the terms "unit(s) and "residue(s)" are used interchangeably to refer generally to the part of a monomer or other chemical unit that has been incorporated into a polymer or other large molecule. In some embodiments, each arm may comprise a PIB chain having from about 3 to about 5,000 isobutylene units. In some embodiments, each arm may comprise a PIB chain having from about 3 to about 4,000 butylene units. In some embodiments, each arm may comprise a PIB chain having from about 3 to about 3,000 isobutylene units. In some embodiments, each arm may comprise a PIB chain having from about 3 to about 2,000 isobutylene units. In some embodiments, each arm may comprise a PIB chain having from about 3 to about 1,000 isobutylene units. In some embodiments, each arm may comprise a PIB chain having from about 3 to about 500 isobutylene units. In some embodiments, each arm may comprise a PIB chain having from about 3 to about 100 isobutylene units.

In some embodiments, each arm may comprise a PIB chain having from about 500 to about 5,000 isobutylene units. In some embodiments, each arm may comprise a PIB chain having from about 2,000 to about 5,000 isobutylene units. In some embodiments, each arm may comprise a PIB chain having from about 3,000 to about 5,000 isobutylene units. In some embodiments, each arm may comprise a PIB chain having from about 4,000 to about 5,000 isobutylene units. In some embodiments, each arm may comprise a PIB chain having from about 100 to about 4,000 isobutylene units. In some embodiments, each arm may comprise a PIB chain having from about 500 to about 3,000 isobutylene units. In some embodiments, each arm may comprise a PIB chain having from about 1,000 to about 3,000 isobutylene units. In some embodiments, each arm may comprise a PIB chain having from about 2,000 to about 3,000 isobutylene units.

Attached to the end of at least one of these PIB chains is a sulfur atom bonded to an ethanol end group. That is, in these embodiments, each sulfur atom is bonded to the end of the PIB chain and separated from a terminal hydroxyl group by two carbon atoms. On one or more embodiments, the sulfur containing, hydroxyl-telechelic PIBs of the present invention will have two arms and the general formula HO—$CH_2CH_2$—S-PIB-S—$CH_2CH_2$—OH. In some embodiments, the sulfur containing hydroxyl telechelic PIBs of the present invention having the formula:

Formula I

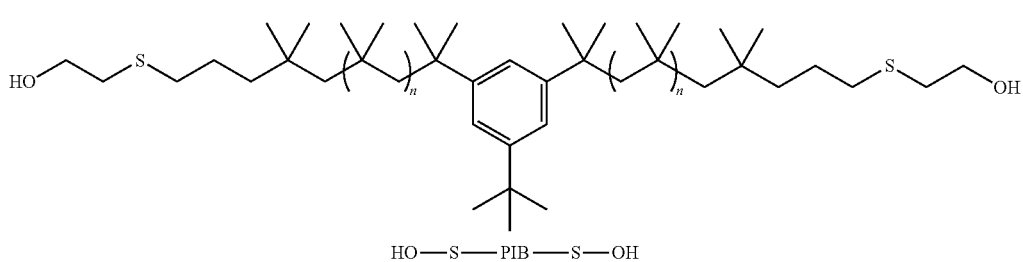

wherein "n" is an integer from about 2 to about 5,000. In some embodiments, n may be an integer from about 2 to about 4,000. In some embodiments, n may be an integer from about 2 to about 3,000. In some embodiments, n may be an integer from about 2 to about 2,000. In some embodiments, n may be an integer from about 2 to about 1,000. In some embodiments, n may be an integer from about 2 to about 500. In some embodiments, n may be an integer from about 2 to about 100. In some embodiments, n may be an integer from about 500 to about 5,000. In some embodiments, n may be an integer from about 1,000 to about 5,000. In some embodiments, n may be an integer from about 2,000 to about 5,000. In some embodiments, n may be an integer from about 3,000 to about 5,000. In some embodiments, n may be an integer from about 4,000 to about 5,000. In some embodiments, n may be an integer from about 1,000 to about 4,000. In some embodiments, n may be an integer from about 2,000 to about 3,000.

In one or more embodiments, the HO—S-PIB-S—OH polymers of the present invention may have a number average molecular weight ($M_n$) of from about 500 g/mol to about 5000 g/mol. In one or more embodiments, the HO—S-PIB-S—OH polymers of the present invention may have a $M_n$ of from about 1000 g/mol to about 4000 g/mol. In one or more embodiments, the HO—S-PIB-S—OH polymers of the present invention may have a $M_n$ of from about 2000 g/mol to about 3000 g/mol. In one or more embodiments, the HO—S-PIB-S—OH polymers of the present invention may have a $M_n$ of from about 2500 g/mol to about 3000 g/mol In one or more embodiments, the HO—S-PIB-S—OH polymers of the present invention may have a polydispersity index (PDI) (wherein PDI=$M_w/M_n$) of from about 1.1 to about 3.0. In one or more embodiments, the HO—S-PIB-S—OH polymers of the present invention may have a PDI of from about 1.1 to about 2.0. In one or more embodiments, the HO—S-PIB-S—OH polymers of the present invention may have a PDI of from about 1.1 to about 1.5. In one or more embodiments, the HO—S-PIB-S—OH polymers of the present invention may have a polydispersity index (PDI) of about 1.01. Table 1, below, summarizes molecular characteristics of HO—S-PIB-S—OH used to prepare sulfur containing PIB based polyurethane (PIB$_S$-PU) polymers described below. Characterization by $^1$H-NMR and $^{13}$C-NMR spectroscopy, and gel permeation chromatography (GPC) indicate HO—S-PIB-S—OH with approximately 100% terminal hydroxyl functionality and low polydispersity (PDI=1.02). (See FIGS. 1-4)

The properties and chemical stability the HO—S-PIB-S—OH of the present invention have been found to be very similar to that of di-hydroxyl terminated PIBs (OH-PIB-OHs) without sulfur, but have surprisingly better creep resistance and are easier and less expensive to make. It is believed the chemical stability the HO—S-PIB-S—OH may stem from the fact that the S—C bonds in the HO—S-PIB-S—OH polymers are not susceptible to hydrolysis by acids. Creep (sometimes called cold flow) is deformation under a constant load or the tendency of a solid to slowly deform permanently under stress and the HO—S-PIB-S—OH of the present invention have been shown to have surprisingly better creep resistance than a corresponding HO-PIB-OH polymer.

The structure of a HO—S-PIB-S—OH polymer according to one or more embodiments of the present invention was evaluated by $^1$H-NMR and GPC. FIG. 1 shows the $^1$H-NMR spectrum, together with assignments. As can be seen the —C$\underline{H}_2$—CH$_2$—S—CH$_2$—CH$_2$—OH protons appear at 2.22 ppm as a triplet. The triplets at 2.57 and 2.82 ppm are associated with methylene protons adjacent to sulfur, and the doublet of triplets at 3.80 ppm are due to methylene protons adjacent to the hydroxyl group. The resonances between 0 and 1.8 ppm are due to methylene protons of PIB. The GPC trace of HO—S-PIB-S—OH (FIGS. 3, 4) is characteristic of a well-defined low polydispersity (PDI=1.02) material.

In a second aspect, embodiments of the present invention are directed to a method of making the novel sulfur containing, hydroxyl-telechelic PIBs (HO—S-PIB-S—OH) described above. In one or more embodiments, the method begins with the production of a PIB having one or more arms with unsaturated end groups, extending from a core. As set forth above, star shaped PIB polymers are generally well known in the art and the composition of the core from which the PIB arms extend is not particularly limited, but may include, without limitation tBudiCumCl bifunctional initiator. In some embodiments, the core will be comprised of the residue of the multi-functional initiator used to form the PIB. Each of the arms of these PIBs comprises a PIB chain running from the core to an unsaturated end group. It should be understood that these PIBs differ from the HO—S-PIB-S—OH polymers of the present invention only by their end group and therefore may have the core, number of arms, length of arms, etc. described above for the HO—S-PIB-S—OH polymers of the present invention. In some embodiments, the unsaturated end group may be an allyl group. In other embodiments, the unsaturated end group may be a vinylidene group. In some embodiments, these PIBs may have two allyl-telechelic arms extending from a core (A-PIB-A). Allyl terminated PIB star polymers are well known from other patents of one or more of the inventors and assigned to the University of Akron. In some embodiments, A-PIB-A polymers made be synthesized as set forth in Ummadisetty, S., and Kennedy, J. P., "Quantitative Syntheses of Novel Polyisobutylenes Fitted with Terminal Primary —Br, —OH, —NH$_2$, and Methacrylate Termini", Journal of Polymer Science: Part A: Polymer Chemistry, 2008, 46, 4236, the disclosure of which is incorporated herein by reference in its entirety, Scheme 1, below outlines a synthetic strategy for the preparation of HO—S-PIB-S—OH according to one or more embodiments of the present invention. This α,ω-primary hydroxyl telechelic PIB may be quantitatively obtained by photochemical thiol-ene click reaction using A-PIB-As plus HS—CH$_2$CH$_2$—OH, followed washing with water. This synthesis is cheaper, simpler and less time consuming than that of HO-PIB-OH, which involves expensive hydroboration and purification steps.

Scheme 1
Strategy for the Synthesis of HO-S-PIB-S-OH

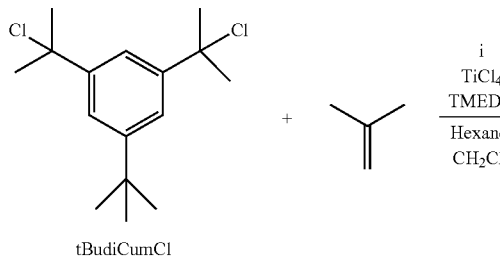

tBudiCumCl

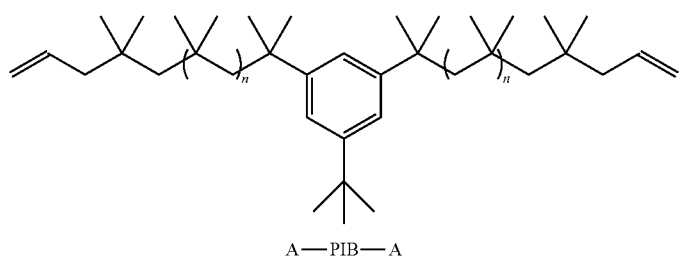

A—PIB—A

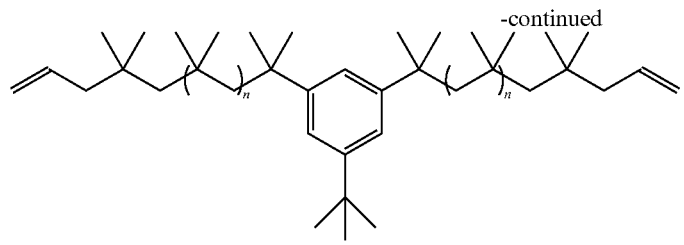
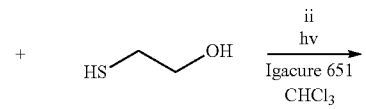
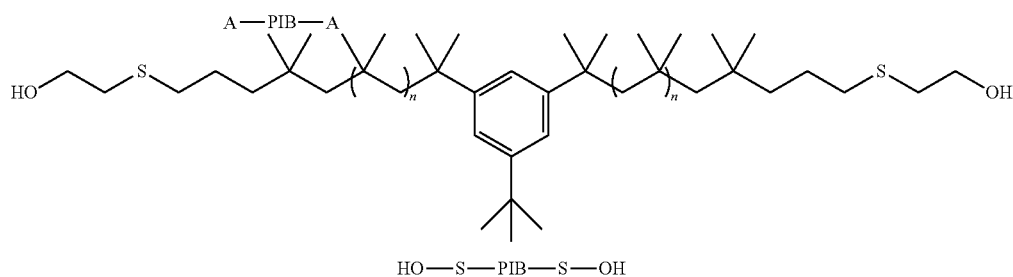

In the first reaction in Scheme 1 (i) outlines a method for making an allyl-terminated PIB (A-PIB-A), from which the HO—S-PIB-S—OH polymers of various embodiments of the present invention may be formed. The process starts with the polymerization of isobutylene with tert-butyl-dicumyl chloride (tBudiCumCl) bifunctional initiator for the synthesis of allyl telechelic PIB (A-PIB-A). In one or more of these embodiments, a bifunctional initiator, such as tert-butyl-dicumyl chloride (tBudiCumCl), tetramethylethylenediamine (TMEDA) and/or other amines, and one or more suitable solvents such as dichloromethane and/or hexane, are placed in a suitable container and isobutylene is added. In these embodiments, a suitable catalyst, such as titanium tetrachloride (TiCl$_4$), is added to start polymerization of the isobutylene and the bifunctional initiator. In these embodiments, allyltrimethylsilane (ATMS) is then added to the mixture to terminate polymerization and the reaction is next quenched with a solution of methanol and sodium bicarbonate (NaHCO$_3$) to produce the polyisobutylene having one or more allyl (unsaturated) end groups (A-PIB-A).

Turning back to Scheme 1, the second reaction (ii) outlines a method for synthesizing a HO—S-PIB-S—OH according to one or more embodiments of the present invention from the A-PIB-A polymer described above. In these embodiments, 2-mercaptoethanol is attached the A-PIB-A polymer by means of a conventional "click" reaction between the thiol group on the 2-mercaptoethanol and the terminal allyl groups on the A-PIB-A to produce a HO—S-PIB-S—OH polymer according to one or more embodiments of the present invention. It should be appreciated that this reaction may be photoinitiated and, in some embodiments, the method includes combining the A-PIB-A polymer with 2-mercaptoethanol and a photoinitiator, such as Igacure 651, and exposing it to ultra-violet light to produce a HO—S-PIB-S—OH polymer according to one or more embodiments of the present invention.

Figure 2:
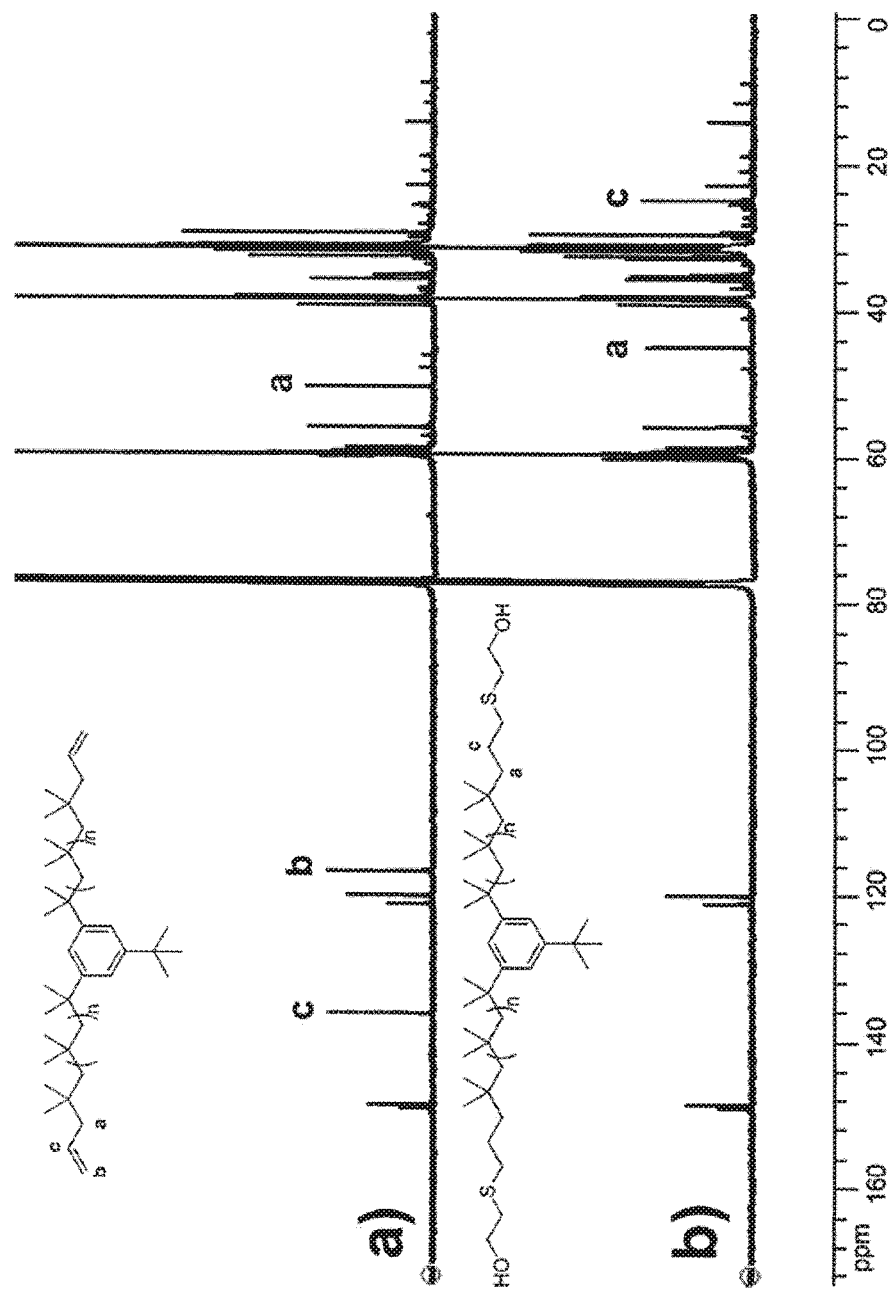
FIG. 2 is a $^{13}$C-NMR spectra of A-PIB-A (a) and HO—S-PIB-S—OH (b) (in $CDCl_3$)
Figure 3:
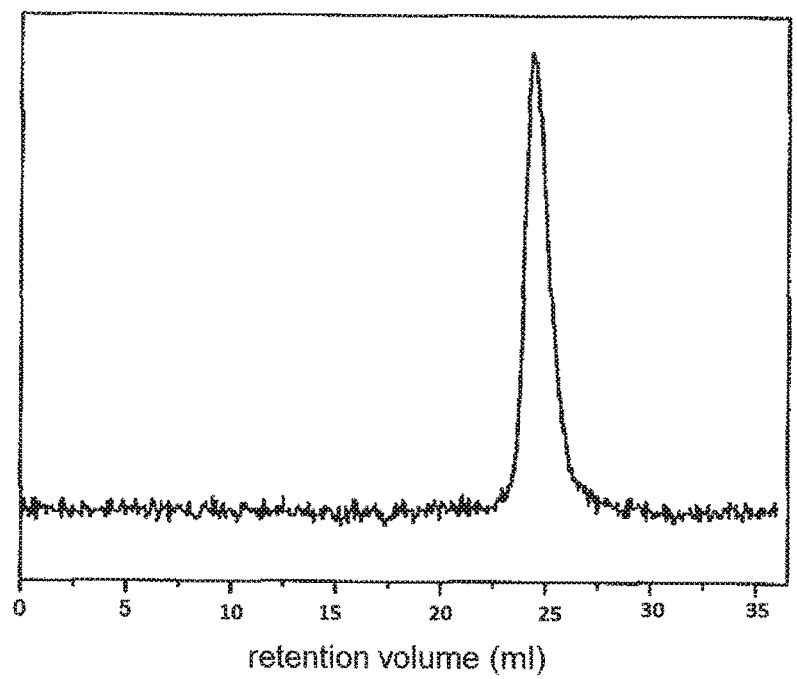
FIG. 3 is a GPC Chromatogram of HO—S-PIB-S—OH.

The product was characterized by $^{13}$C-NMR spectroscopy, and gel permeation chromatography (GPC). FIG. 2 shows the $^{13}$C-NMR spectrum of A-PIB-A and a corresponding HO—S-PIB-S—OH polymer according to an embodiment of the present invention, together with assignments. Inspection of the $^{13}$C-NMR spectrum of FIG. 2 shows (a) the absence of allylic carbons (116.95, 136.33 ppm) together with an upfield shift of allylic carbon (50.53→45.08 ppm), (b) the presence of methylene carbons adjacent to the OH at 60.41 ppm, (c) the presence of methylene carbons adjacent to sulfur at 32.86 and 35.28 ppm, and (d) the presence of —CH$_2$—$\underline{C}$H$_2$—CH$_2$—S—CH$_2$—CH$_2$—OH carbon (one of the former allylic carbons) at 24.99 ppm. The GPC trace of HO—S-PIB-S—OH (FIGS. 3, 4) is characteristic of a well-defined low polydispersity (PDI=1.02) material. These results confirmed the regioselective formation of HO—S-PIB-S—OH with low polydispersity index (PDI=1.02) and close to 100% chain end hydroxyl functionality. (See e.g. FIGS. 3, 4)

In a third aspect, embodiments of the present invention are directed to a sulfur containing, hydrolytically and oxidatively resistant, biocompatible and biostable PIB-based PU made with the HO—S-PIB-S—OH polymer described above. In these embodiments, the HO—S-PIB-S—OH polymers described above may be reacted with one or more diisocyanates and one or more chain extenders, to form a sulfur containing PIB-based PU. As will be appreciated by those of skill in the art, polyurethane elastomers exhibit a two-phase morphology, wherein the hard segments form discrete domains in a matrix of soft segments. In the PIB-based PUs of embodiments of the present invention, the HO—S-PIB-S—OH polymers comprise the soft segments, and the diisocyanates and chain extenders produce the hard segments. For simplicity, polyurethanes (PUs) synthesized with HO—S-PIB-S—OH are abbreviated PIB$_S$-PU. PUs prepared using HO-PIB-OH are denoted PIB$_O$-PU. The symbol in front of PIB, if any, indicates the wt % of PIB used. For example, the term "72.5PIB$_S$-PU" indicates a PU made with 72.5 wt % HO—S-PIB-S—OH. "An" stands for annealed.

Accordingly, in various embodiments, the sulfur containing, PIB-based PUs of the present invention will comprise the residue of at least one of the HO—S-PIB-S—OH polymers described above having two sulfur containing, hydroxyl-telechelic polyisobutylene arms extending from a core, the residue of one or more suitable isocyanates, and the residue of one or more suitable chain extenders. Suitable isocyanates are well known in the art and may include, without limitation, 4,4'-methylenebis(phenyl isocyanate) (MDI), 4,4'-methylenebis(cyclohexyl isocyanate) (HMDI), isophorone diisocyanate or combinations thereof. Suitable chain extenders may include, without limitation, short chain diols, butane diol (BDO), hexamethylene diol (HDO), poly(tetrahydrofuran) (BG9), or combinations thereof.

In some embodiments, the residue of the one or more sulfur containing hydroxyl-telechelic PIBs comprise from about 50 weight % to about 80 weight % of said sulfur containing PIB-based PU. In some embodiments, the residue of the one or more sulfur containing hydroxyl-telechelic PIBs comprise from about 50 weight % to about 75 weight % of said sulfur containing PIB-based PU. In some embodiments, the residue of the one or more sulfur containing hydroxyl-telechelic PIBs comprise from about 50 weight % to about 70 weight % of said sulfur containing PIB-based PU. In some embodiments, the residue of the one or more sulfur containing hydroxyl-telechelic PIBs comprise from about 50 weight % to about 65 weight % of said sulfur containing PIB-based PU. In some embodiments, the residue of the one or more sulfur containing hydroxyl-telechelic PIBs comprise from about 50 weight % to about 60 weight % of said sulfur containing PIB-based PU. In some embodiments, the residue of the one or more sulfur containing hydroxyl-telechelic PIBs comprise from about 55 weight % to about 80 weight % of said sulfur containing PIB-based PU. In some embodiments, the residue of the one or more sulfur containing hydroxyl-telechelic PIBs comprise from about 60 weight % to about 80 weight % of said sulfur containing PIB-based PU. In some embodiments, the residue of the one or more sulfur containing hydroxyl-telechelic PIBs comprise from about 65 weight % to about 80 weight % of said sulfur containing PIB-based PU. In some embodiments, the residue of the one or more sulfur containing hydroxyl-telechelic PIBs comprise from about 70 weight % to about 80 weight % of said sulfur containing PIB-based PU. In some embodiments, the residue of the one or more sulfur containing hydroxyl-telechelic PIBs comprise from about 55 weight % to about 75 weight % of said sulfur containing PIB-based PU. In some embodiments, the residue of the one or more sulfur containing hydroxyl-telechelic PIBs comprise from 60 weight % or more to 70 weight % or less of said sulfur containing PIB-based PU.

In some embodiments, the residue of the one or more isocyanates comprise from about 10 weight % to about 30 weight % of said sulfur containing PIB-based PU. In some embodiments, the residue of the one or more isocyanates comprise from about 15 weight % to about 30 weight % of said sulfur containing PIB-based PU. In some embodiments, the residue of the one or more isocyanates comprise from about 17 weight % to about 30 weight % of said sulfur containing PIB-based PU. In some embodiments, the residue of the one or more isocyanates comprise from about 20 weight % to about 30 weight % of said sulfur containing PIB-based PU. In some embodiments, the residue of the one or more isocyanates comprise from about 23 weight % to about 30 weight % of said sulfur containing PIB-based PU. In some embodiments, the residue of the one or more isocyanates comprise from about 25 weight % to about 30 weight % of said sulfur containing PIB-based PU. In some embodiments, the residue of the one or more isocyanates comprise from about 12 weight % to about 25 weight % of said sulfur containing PIB-based PU. In some embodiments, the residue of the one or more isocyanates comprise from about 12 weight % to about 22 weight % of said sulfur containing PIB-based PU. In some embodiments, the residue of the one or more isocyanates comprise from about 12 weight % to about 20 weight % of said sulfur containing PIB-based PU. In some embodiments, the residue of the one or more isocyanates comprise from about 12 weight % to about 18 weight % of said sulfur containing PIB-based PU. In some embodiments, the residue of the one or more isocyanates comprise from about 17 weight % to about 25 weight % of said sulfur containing PIB-based PU.

In some embodiments, the residue of HMDI comprises from about 17 weight % to about 24 weight % of said sulfur containing PIB-based PU. In some embodiments, the residue of MDI comprises from about 19 weight % to about 24 weight % of said sulfur containing PIB-based PU.

In some embodiments, the residue of the one or more chain extenders comprise from about 2 weight % to about 15 weight % of said sulfur containing PIB-based PU. In some embodiments, the residue of the one or more chain extenders comprise from about 2 weight % to about 13 weight % of said sulfur containing PIB-based PU. In some embodiments, the residue of the one or more chain extenders comprise from about 2 weight % to about 11 weight % of said sulfur containing PIB-based PU. In some embodiments, the residue of the one or more chain extenders comprise from about 2 weight % to about 9 weight % of said sulfur containing PIB-based PU. In some embodiments, the residue of the one or more chain extenders comprise from about 2 weight % to about 7 weight % of said sulfur containing PIB-based PU. In some embodiments, the residue of the one or more chain extenders comprise from about 2 weight % to about 5 weight % of said sulfur containing PIB-based PU. In some embodiments, the residue of the one or more chain extenders comprise from about 4 weight % to about 15 weight % of said sulfur containing PIB-based PU. In some embodiments, the residue of the one or more chain extenders comprise from about 7 weight % to about 15 weight % of said sulfur containing PIB-based PU. In some embodiments, the residue of the one or more chain extenders comprise from about 9 weight % to about 15 weight % of said sulfur containing PIB-based PU. In some embodiments, the residue of the one or more chain extenders comprise from about 11 weight % to about 15 weight % of said sulfur containing PIB-based PU. In some embodiments, the residue of the one or more chain extenders comprise from about 4 weight % to about 13 weight % of said sulfur containing PIB-based PU.

In some embodiments, the residue of HDO comprises from about 2 weight % to about 15 weight % of said sulfur containing PIB-based PU. In some embodiments, the residue of HDO comprises from about 2 weight % to about 10 weight % of said sulfur containing PIB-based PU. In some embodiments, the residue of HDO comprises from about 2 weight % to about 7 weight % of said sulfur containing PIB-based PU. In some embodiments, the residue of HDO comprises from about 4 weight % to about 7 weight % of said sulfur containing PIB-based PU. In some embodiments, the residue of BG9 comprises from about 2 weight % to about 15 weight % of said sulfur containing PIB-based PU. In some embodiments, the residue of BG9 comprises from about 2 weight % to about 12 weight % of said sulfur containing PIB-based PU. In some embodiments, the residue of BG9 comprises from about 2 weight % to about 10 weight % of said sulfur containing PIB-based PU. In some embodiments, the residue of BG9 comprises from about 6 weight % to about 12 weight % of said sulfur containing PIB-based PU.

Figure 4:
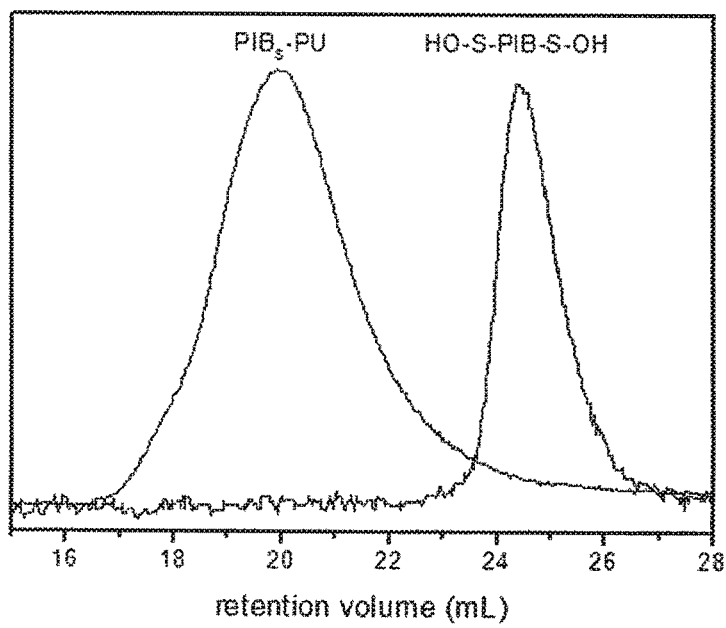
FIG. 4 is a graph showing GPC traces of HO—S-PIB-S—OH and 72.5% PIB$_S$-PU.

FIG. 4 depicts GPC traces of HO—S-PIB-S—OH and 72.5% PIB$_S$-PU, and Table 1 shows molecular characteristics. The shift of the narrow peak (Mw~3200 g/mol) associated with HO—S-PIB-S—OH toward lower retention volumes (Mw~160,000 g/mol) indicates polymerization. The amount of unreacted HO—S-PIB-S—OH after polymerization is negligible (absence of a hump at ~25 mL in the 72.5%

PIB$_S$-PU trace). The PIB$_S$-PU trace shows a slight shoulder at ~18 mL most likely due to allophanates.

TABLE 1

Molecular Weight Characteristics of A-PIB-A, HO-S-PIB-S-OH, and 72.5% PIB$_S$PU

|  | $M_{n,theor}$ | $M_{n,GPC}$ | $M_{w,GPC}$ | $M_w/M_n$ | $M_{n,NMR}$ | DP[d] |
|---|---|---|---|---|---|---|
| A-PIB-A | 3000[a] | 3120[b] | 3190[b] | 1.02[b] | 3100 | 26 |
| HO-S-PIB-S-OH | 3150[a] | 3320[b] | 3360[b] | 1.02[b] | 3370 | 27 |
| 72.5% PIB$_S$-PU[e] | — | ~110k[c] | ~160k[c] | ~1.5[c] | — | — |

[a]Theoretical values calculated from [monomer]/[initiator], taking into account end-groups.
[b]Molecular weights and polydispersities by GPC (RI detector), calibrated with PIB standards.
[c]Absolute molecular weights and polydispersities by GPC-MALLS.
[d]Calculated from $^1$H-NMR data.
[e]Made of 72.5 wt % HO-S-PIB-S-OH, 21.7 wt % MDI and 5.8 wt % BDO.

Figure 5:
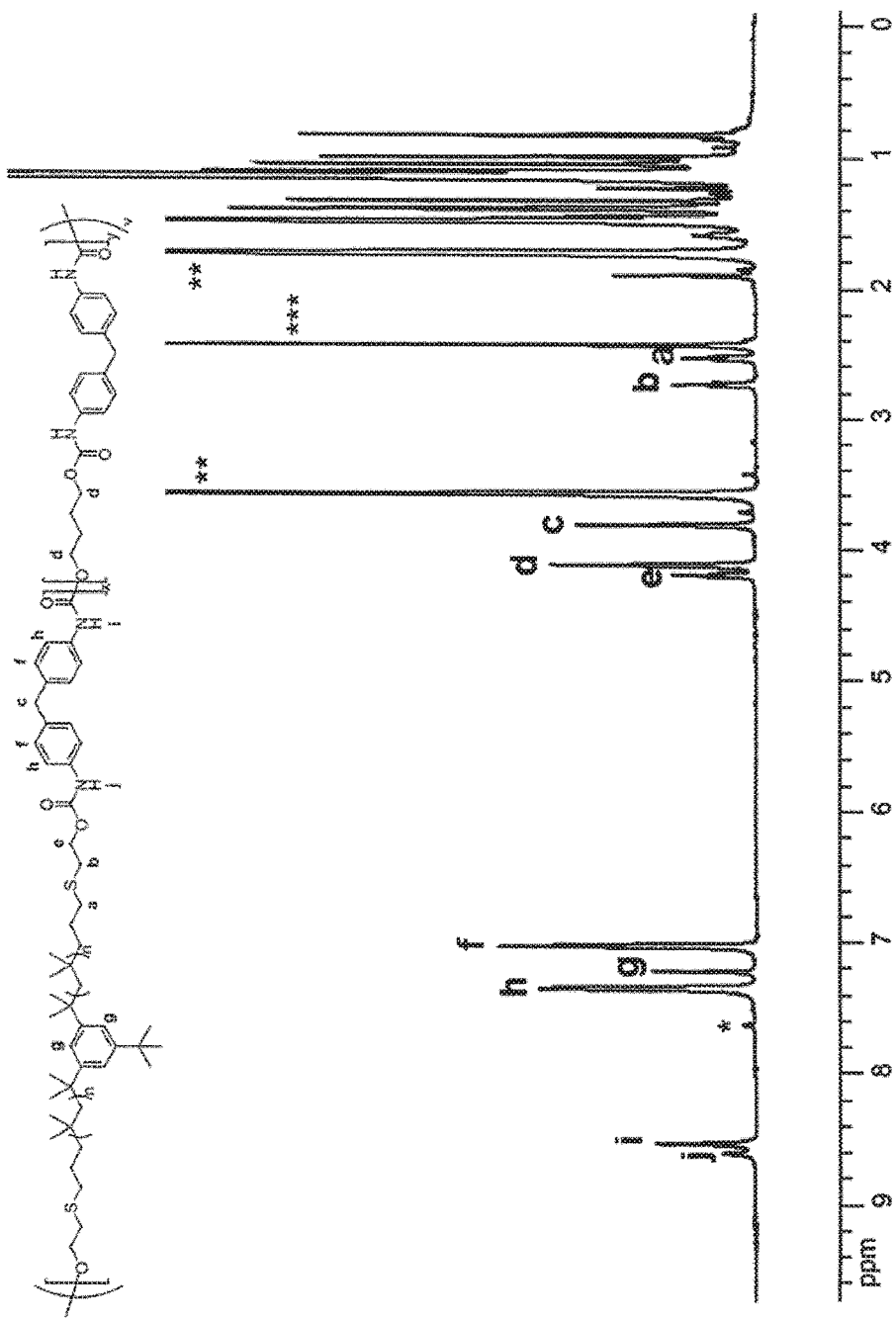
FIG. 5 is a 500 MHz $^1$H-NMR spectrum of 72.5% PIB$_S$-PU (made with 72.5% HO—S-PIB-S—OH, 21.7 wt % MDI and 5.8 wt % BDO) in THF-d8, wherein * is NH of urea bonds,  is the residual solvent, and * is water.

FIG. 5 shows the $^1$H NMR spectrum of 72.5% PIB$_S$-PU together with assignments. The multiplets at 8.54 and 8.62 ppm are due to urethane bonds. The characteristic signals of the hard and soft segments are clearly visible and their integrated ratio specify provides their content in the PU. The signal at 7.64 ppm is due to urea protons (N$\underline{\text{H}}$) that arise in the presence of moisture. Resonances in the 0-2 ppm range are due to the aliphatic protons of PIB and BDO.

In some embodiments, the sulfur containing PIB-based PUs of the present invention may have a number average molecular weight ($M_n$) of from about 7,000 g/mol to about 800,000 g/mol. In some embodiments, the sulfur containing PIB-based PUs of the present invention may have a $M_n$ of from about 7,000 g/mol to about 600,000 g/mol. In some embodiments, the sulfur containing PIB-based PUs of the present invention may have a $M_n$ of from about 7,000 g/mol to about 300,000 g/mol. In some embodiments, the sulfur containing PIB-based PUs of the present invention may have a $M_n$ of from about 7,000 g/mol to about 100,000 g/mol. In some embodiments, the sulfur containing PIB-based PUs of the present invention may have a $M_n$ of from about 50,000 g/mol to about 800,000 g/mol. In some embodiments, the sulfur containing PIB-based PUs of the present invention may have a $M_n$ of from about 200,000 g/mol to about 800,000 g/mol. In some embodiments, the sulfur containing PIB-based PUs of the present invention may have a $M_n$ of from about 400,000 g/mol to about 800,000 g/mol. In some embodiments, the sulfur containing PIB-based PUs of the present invention may have a $M_n$ of from about 600,000 g/mol to about 800,000 g/mol. In some embodiments, the sulfur containing PIB-based PUs of the present invention may have a $M_n$ of from about 50,000 g/mol to about 600,000 g/mol. In some embodiments, the sulfur containing PIB-based PUs of the present invention may have a $M_n$ of from about 100,000 g/mol to about 400,000 g/mol.

In some embodiments, the sulfur containing PIB-based PUs of the present invention may have a polydispersity index (PDI) (wherein PDI=$M_w/M_n$) of from about 3.0 to about 1.2. In some embodiments, the sulfur containing PIB-based PUs of the present invention may have a PDI of from about 2.5 to about 1.2. In some embodiments, the sulfur containing PIB-based PUs of the present invention may have a PDI of from about 2.0 to about 1.2. In some embodiments, the sulfur containing PIB-based PUs of the present invention may have a PDI of from about 1.5 to about 1.2. In some embodiments, the sulfur containing PIB-based PUs of the present invention may have a PDI of from about 3.0 to about 1.5. In some embodiments, the sulfur containing PIB-based PUs of the present invention may have a PDI of from about 3.0 to about 2.0. In some embodiments, the sulfur containing PIB-based PUs of the present invention may have a PDI of about 1.3.

In some embodiments, the sulfur containing PIB-based PUs of the present invention may have the formula:

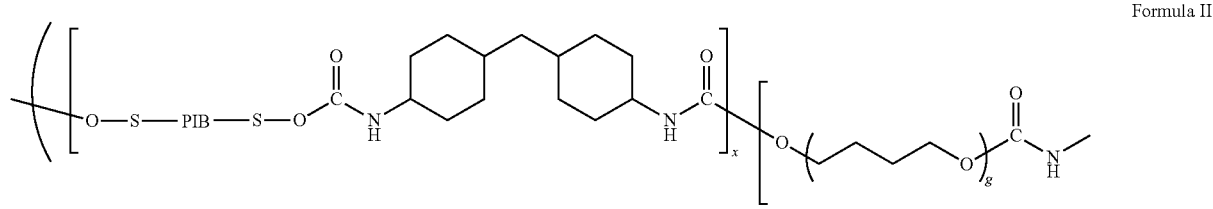

Formula II

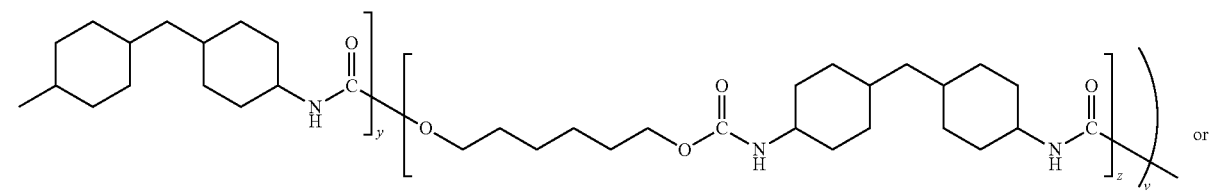

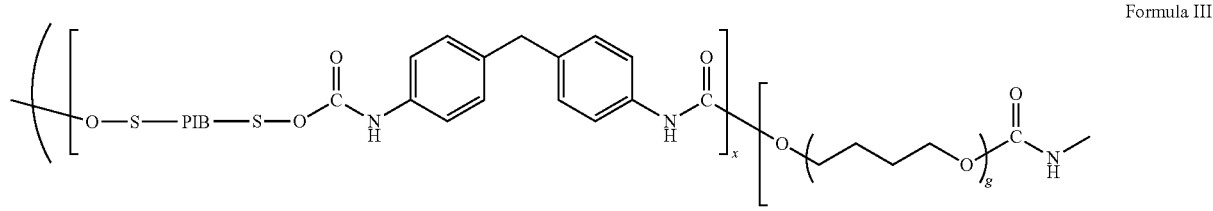

Formula III

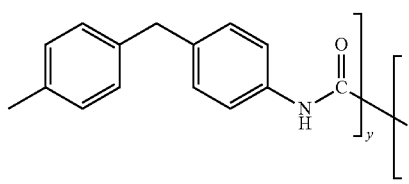

wherein x is an integer from about 5 to about 100; y is an integer from 5 to about 100; z is an integer from about 5 to about 100; v is an integer from about 5 to about 100; and there are two additional carbon atoms between each sulfur atom bonded to the PIB chain and the adjacent oxygen atom.

In some embodiments, x may be an integer from about 5 to about 90. In some embodiments, x may be an integer from about 5 to about 75. In some embodiments, x may be an integer from about 5 to about 50. In some embodiments, x may be an integer from about 5 to about 25. In some embodiments, x may be an integer from about 5 to about 10. In some embodiments, x may be an integer from about 15 to about 100. In some embodiments, x may be an integer from about 25 to about 100. In some embodiments, x may be an integer from about 50 to about 100. In some embodiments, x may be an integer from about 75 to about 100. In some embodiments, x may be an integer from about 15 to about 80. In some embodiments, x may be an integer from about 25 to about 75.

In some embodiments, y may be an integer from about 5 to about 90. In some embodiments, y may be an integer from about 5 to about 75. In some embodiments, y may be an integer from about 5 to about 50. In some embodiments, y may be an integer from about 5 to about 25. In some embodiments, y may be an integer from about 5 to about 10. In some embodiments, y may be an integer from about 15 to about 100. In some embodiments, y may be an integer from about 25 to about 100. In some embodiments, y may be an integer from about 50 to about 100. In some embodiments, y may be an integer from about 75 to about 100. In some embodiments, y may be an integer from about 15 to about 80. In some embodiments, y may be an integer from about 25 to about 75.

In some embodiments, z may be an integer from about 5 to about 90. In some embodiments, z may be an integer from about 5 to about 75. In some embodiments, z may be an integer from about 5 to about 50. In some embodiments, z may be an integer from about 5 to about 25. In some embodiments, z may be an integer from about 5 to about 10. In some embodiments, z may be an integer from about 15 to about 100. In some embodiments, z may be an integer from about 25 to about 100. In some embodiments, z may be an integer from about 50 to about 100. In some embodiments, z may be an integer from about 75 to about 100. In some embodiments, z may be an integer from about 15 to about 80. In some embodiments, z may be an integer from about 25 to about 75.

In some embodiments, v may be an integer from about 5 to about 90. In some embodiments, v may be an integer from about 5 to about 75. In some embodiments, v may be an integer from about 5 to about 50. In some embodiments, v may be an integer from about 5 to about 25. In some embodiments, v may be an integer from about 5 to about 10. In some embodiments, v may be an integer from about 15 to about 100. In some embodiments, v may be an integer from about 25 to about 100. In some embodiments, v may be an integer from about 50 to about 100. In some embodiments, v may be an integer from about 75 to about 100. In some embodiments, v may be an integer from about 15 to about 80. In some embodiments, v may be an integer from about 25 to about 75.

Figure 6:
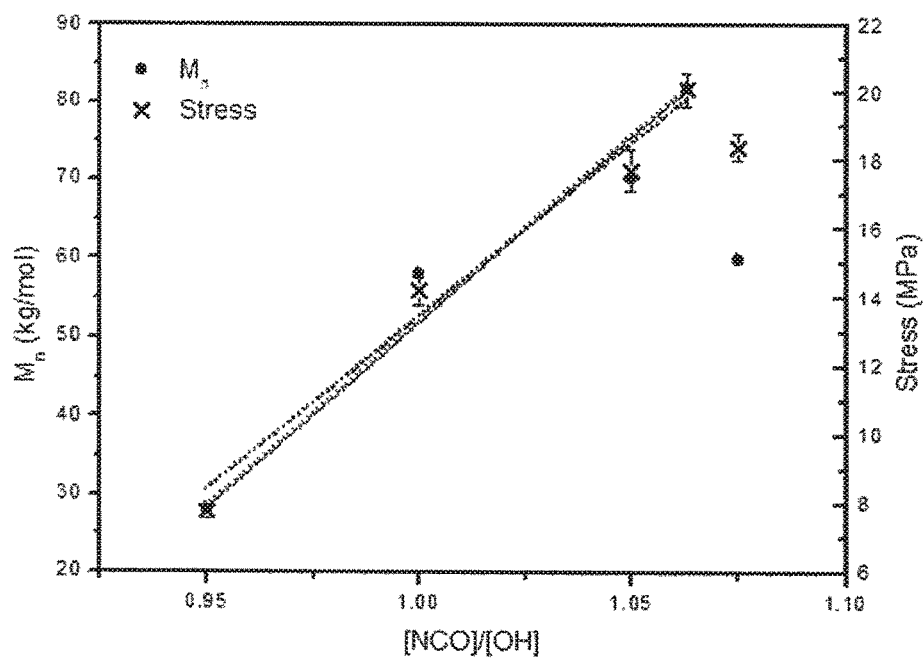
FIG. 6 is a graph showing the results of titration experiments: 75% PIB$_S$-PU Molecular Weights (Mn) (•) and Tensile Strengths versus [MDI]/[HO—S-PIB-S—OH] (X).

As will be appreciated by those of skill in the art, both the reaction conditions and purity of ingredients are important for the reproducible synthesis of high quality PIB-based PUs. Similarly, we obtained best mechanical properties and highest molecular weight $PIB_S$-PUs with high purity ingredients at [NCO]/[OH] ~1.06. FIG. 6 shows molecular weights and tensile strengths of 72.5% $PIB_S$-PUs obtained by "titration", i.e., experiments in which PUs were prepared with various [NCO]/[OH] ratios. Both Mn and tensile strength versus [NCO]/[OH] plots are linear and essentially identical in the [NCO]/[OH] ratio in the 0.95 to 1.06 range, after which they decline. Highest molecular weights and tensile strengths were obtained with a [NCO]/[OH] ratio of 1.06.

The tensile stress and strain properties of selected sulfur containing PIB-based PUs of the present invention, two HO-PIB-OH based PUs and a commercially PDMS diol based PU (Elast-Eon™ E2A (AorTech International plc, Weybridge, UK)); were determined using an Instron materials testing instrument. A benchtop die (ASTM D638 type V) was used to cut dog-bones from cast films. Samples (25 mm long, 3.1 mm width at the neck) were tested to failure at a crosshead speed of 25 mm/min at room temperature. Averages of at least three measurements are reported on Table 2, below.

TABLE 2

Summary of the compositions, tensile strengths and elongations of PUs Prepared.

| Composition | Sample Tensile strength (MPa) | Elongation (%) |
|---|---|---|
| HO—S—PIB—S—OH (60 wt %), HMDI (23 wt %), HDO (5 wt %), BG9 (12 wt %) | 26.6 | 680 |
| HO—S—PIB—S—OH (70 wt %), HMDI (19 wt %), HDO (5 wt %), BG9 (6 wt %)[a] | 16.6 | 600 |
| HO—S—PIB—S—OH (60 wt %), MDI (23 wt %), HDO (7 wt %), BG9 (10 wt %)[a] | 21.6 | 455 |
| HO—S—PIB—S—OH (70 wt %), MDI (19 wt %), HDO (5 wt %), BG9 (6 wt %)[a] | 13.8 | 550 |
| HO—PIB—OH (60 wt %), HMDI (22 wt %), HDO (6 wt %), BG9 (12 wt %)[b] | 28.1 | 690 |
| HO—PIB—OH (70 wt %), HMOI (17.5 wt %), HDO (4 wt %), BG9 (8.5 wt %)[b] | 14.8 | 980 |
| Elast-Eon ™ E2A; PDMS diol (49%), MDI (33 wt %), BDO (6 wt %), PHMO (12 wt %)[a,c] | 30.6 | 440 |

[a]Annealed at 100° C. for 15 h before testing
[b]Data from G. Erdodi, J. Kang, J. P. Kennedy, *J. Polym. Sci., Polym. Chem.* 2010, 48, 2361-2371.
[c]In-house measurements; according to the manufacturer's (Aortech) pamphlet: tensile strength 26 MPa, elongation >450%

In some embodiments, the sulfur containing PIB-based PUs of the present invention may have a tensile strength of from about 0.5 MPa to about 40 MPa. In some embodiments, the sulfur containing PIB-based PUs of the present invention may have a tensile strength of from about 0.5 MPa to about 30 MPa. In some embodiments, the sulfur containing PIB-based PUs of the present invention may have a tensile strength of from about 0.5 MPa to about 20 MPa. In some embodiments, the sulfur containing PIB-based PUs of the present invention may have a tensile strength of from about 0.5 MPa to about 10 MPa. In some embodiments, the sulfur containing PIB-based PUs of the present invention may have a tensile strength of from about 5 MPa to about 40 MPa. In some embodiments, the sulfur containing PIB-based PUs of the present invention may have a tensile strength of from about 10 MPa to about 40 MPa. In some embodiments, the sulfur containing PIB-based PUs of the present invention may have a tensile strength of from about 20 MPa to about 40 MPa. In some embodiments, the sulfur containing PIB-based PUs of the present invention may have a tensile strength of from about 30 MPa to about 40 MPa. In some embodiments, the sulfur containing PIB-based PUs of the present invention may have a tensile strength of from about 5 MPa to about 30 MPa.

In some embodiments, the sulfur containing PIB-based PUs of the present invention may have a tensile elongation of from about 50% to about 500%. In some embodiments, the sulfur containing PIB-based PUs of the present invention may have a tensile elongation of from about 50% to about 400%. In some embodiments, the sulfur containing PIB-based PUs of the present invention may have a tensile elongation of from about 50% to about 300%. In some embodiments, the sulfur containing PIB-based PUs of the present invention may have a tensile elongation of from about 50% to about 200%. In some embodiments, the sulfur containing PIB-based PUs of the present invention may have a tensile elongation of from about 50% to about 100%. In some embodiments, the sulfur containing PIB-based PUs of the present invention may have a tensile elongation of from about 100% to about 500%. In some embodiments, the sulfur containing PIB-based PUs of the present invention may have a tensile elongation of from about 200% to about 500%. In some embodiments, the sulfur containing PIB-based PUs of the present invention may have a tensile elongation of from about 300% to about 500%. In some embodiments, the sulfur containing PIB-based PUs of the present invention may have a tensile elongation of from about 400% to about 500%. In some embodiments, the sulfur containing PIB-based PUs of the present invention may have a tensile elongation of from about 100% to about 300%.

Figure 7:
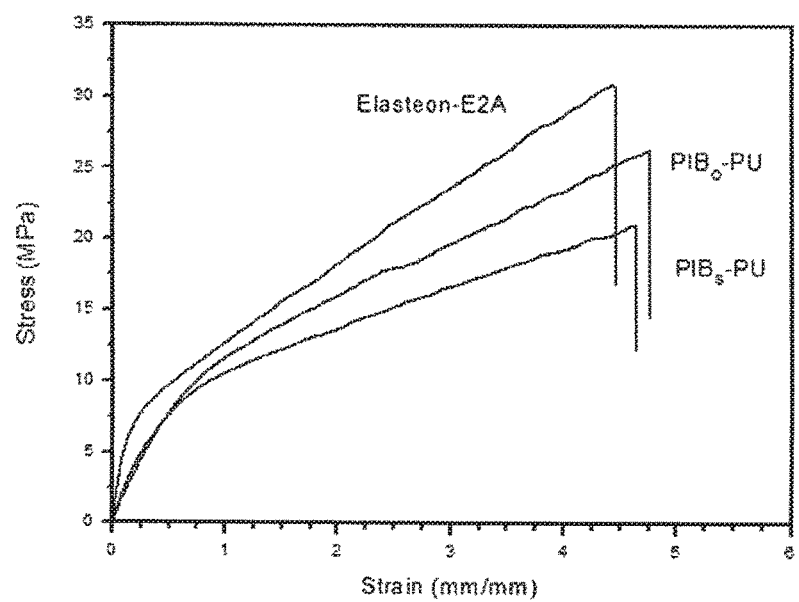
FIG. 7 is a graph showing stress-strain traces of 72.5% PIB$_S$-PU, 72.5% PIB$_O$-PU, and E2A.

Sulfur containing PIB-based PU samples with 60 wt % PIB show tensile properties similar to commercially available Elast-Eon™ E2A. The tensile strength of PUs containing 70 wt % PIB is lower than that of the commercial sample because of the higher amount of soft segment. FIG. 7 shows stress-strain traces of 72.5% PIB$_S$-PU, 72.5% PIB$_O$-PU and E2A (which contains 61% soft segment), and Table 3 summarizes their ultimate strengths and elongations. Expectedly, E2A exhibits highest stress and toughness because its hard segment content is substantially higher (39%) than those of the PIB-based PUs (26.5%). The elastic moduli of PIB$_S$-PU and PIB$_O$-PU are similar, but the former is less tough in the plastic region and therefore of lower ultimate strength. It is believed that PIB$_S$-PU exhibits lower stress than PIB$_O$-PU partly because the hydrogen bonds between hydrogen and sulfur atoms (H . . . S bonds) in the former are weaker than the hydrogen bonds between the hydrogen and the oxygen atoms (H . . . O bonds) in the latter, and because with —S— and —O— in close proximity in the soft segment the larger —S— atom preferentially forms hydrogen bonds (H bonds) with hard segments.

Figure 8:
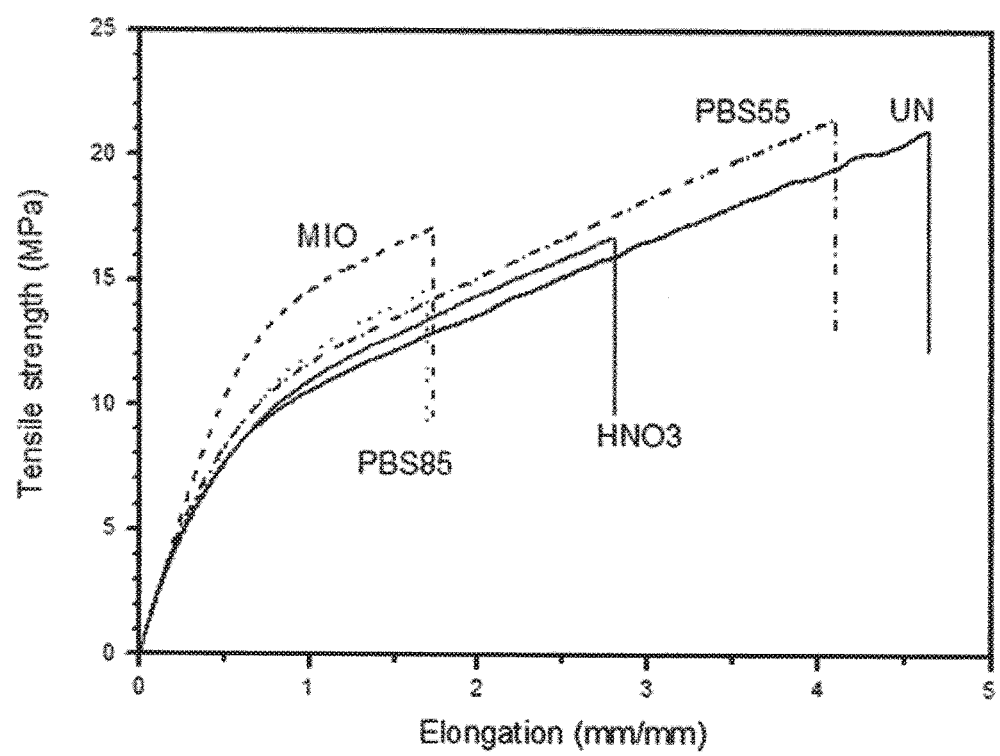
FIG. 8 is a graph showing stress-strain traces of 72.5% PIB$_S$-PUs after hydrolytic and oxidative exposures. UN=untreated specimen; PBS55 and PBS85=aged in aqueous PBS for 12 weeks at 55 and 85° C.; MIO=in aqueous H$_2$O$_2$/CoCl$_2$ for 4 weeks at 37° C.; HNO$_3$=in aqueous 50 v/v % HNO$_3$ for 4 hours at RT.

FIG. 8 shows stress strain traces of 72.5% PIB$_S$-PU after various tests. Surprisingly, samples immersed in CoCl$_2$/H$_2$O$_2$ for 4 weeks, and PBS for 12 weeks at 85° C. became tougher and showed increased yields and moduli relative to the untreated sample. This effect may be due to additional H bonds formed upon oxidation of sulfur (see above) which lead to higher stress retention and lower elongation retention. It is similarly surprising that contact with nitric acid did not produce this effect: After exposing 72.5% PIB, —PU to 50 v/v % HNO$_3$, NMR spectroscopy did not indicate sulfur oxidation and the stress-strain trace remained unchanged.

Figure 9:
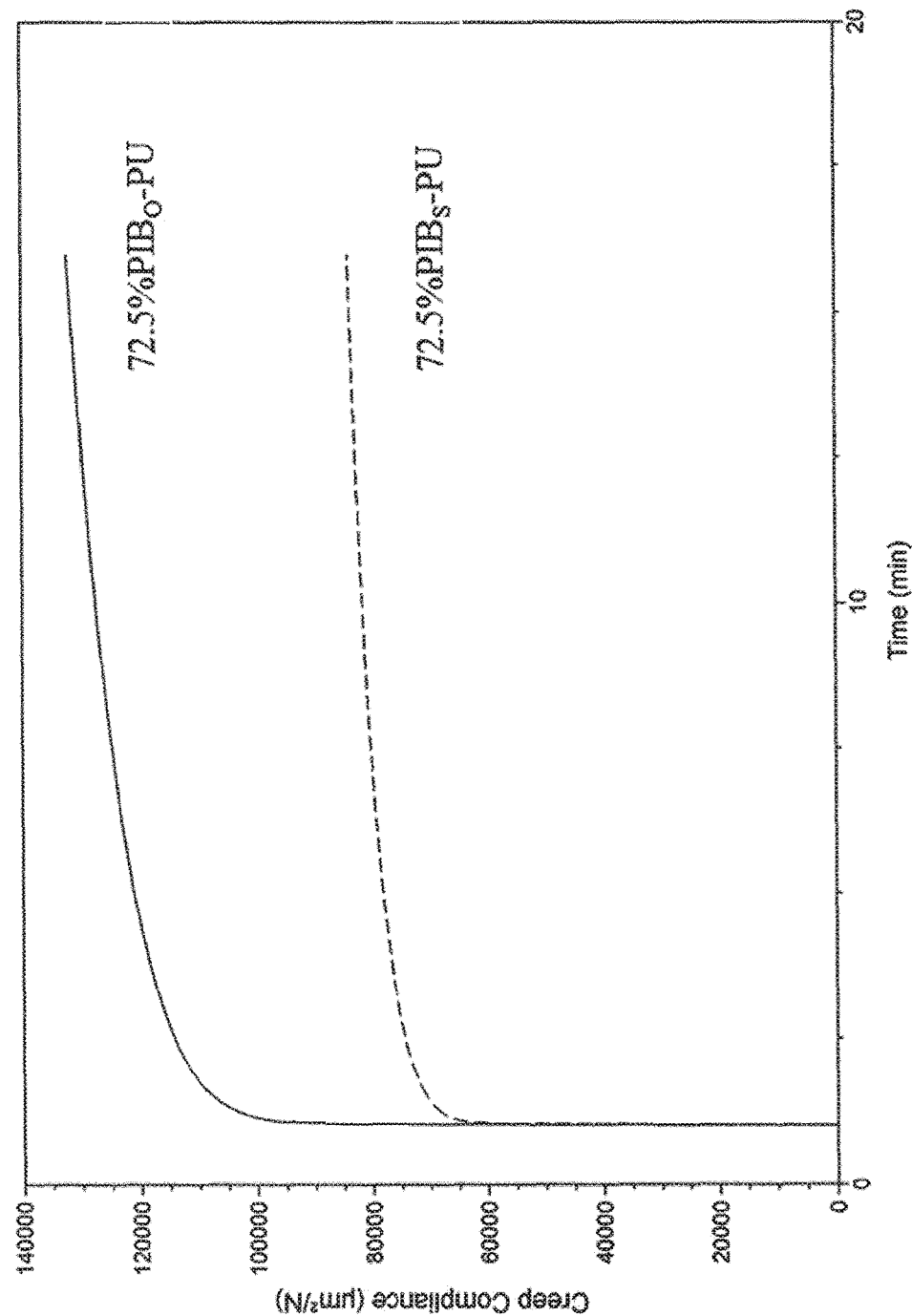
FIG. 9 is a graph showing DMA Thermograms of 72.5% PIB$_O$-PU and 72.5% PIB$_S$-PU.

To further characterize the PIB$_S$-PUs of various embodiments of the present invention, the dynamic mechanical properties of the polymers were also evaluated. FIG. 9 shows storage moduli and tan delta as a function of temperature of PIB$_S$-PU and PIB$_O$-PU. The relaxation temperatures are very similar except PIB$_S$-PU shows less damping likely due to H-bonded S, which restricts molecular motions and thus increases the modulus. As will be appreciated by those of skill in the art, the length of the rubbery plateaus (i.e., the temperature range over which the storage modulus changes little) due to entanglement coupling, and the plateau moduli are, however, quite different. The rubbery plateau of PIB$_S$-PU according to embodiments of the present invention is much longer than that of corresponding PIB$_O$-PUs. As used herein, a "corresponding" PIB$_O$-PU is a PIB$_O$-PU having the same structure as the referenced PIB$_S$-PU, except that it was formed from the corresponding HO-PIB-OH polymer and does not have sulfur atoms in its backbone. This finding suggests chain entanglements and diffuse interphases between the hard and soft segments due to H . . . S bonds.

Figure 10:
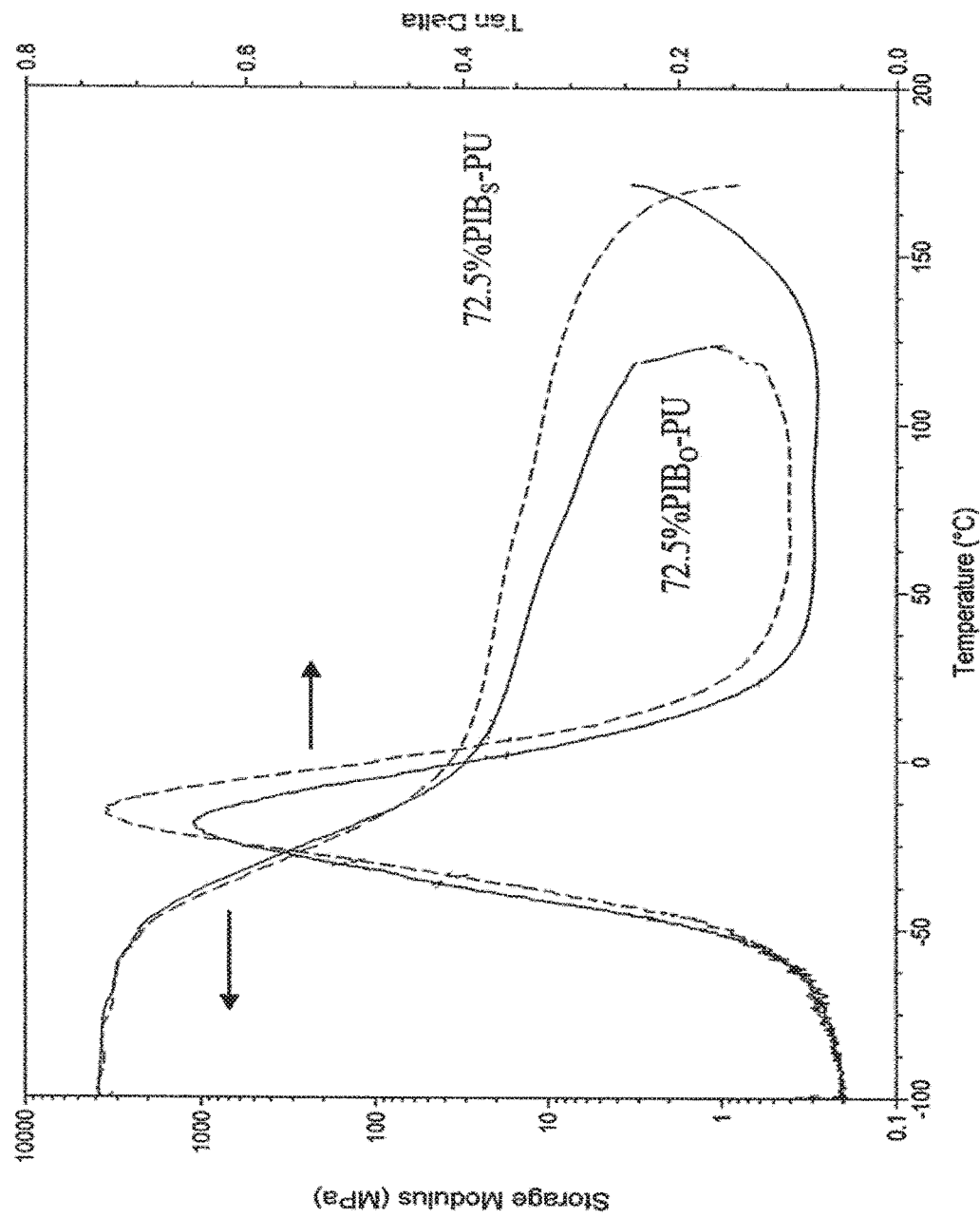
FIG. 10 is a graph showing tensile creep compliance vs time of 72.5% PIB$_O$-PU and 72.5% PIB$_S$-PU.

The PIB$_S$-PU polymers of various embodiments of the present invention have been also shown an unexpectedly large increase in creep resistance, relative to the corresponding PIB$_O$-PUs. Creep is time dependent deformation under load. FIG. 10 shows creep compliance versus time for PIB$_O$-PU and PIB$_S$-PU. While not to be bound by theory, it is believed that the significantly lower (~36%) creep of PIB$_S$-PU than PIB$_O$-PU may be caused by chain entanglements and diffuse interphases between the hard and soft segments caused by H . . . S bonds in addition to H . . . O bonds. This is also evident by the longer rubbery plateau seen by DMA (See FIG. 9).

Figure 11:
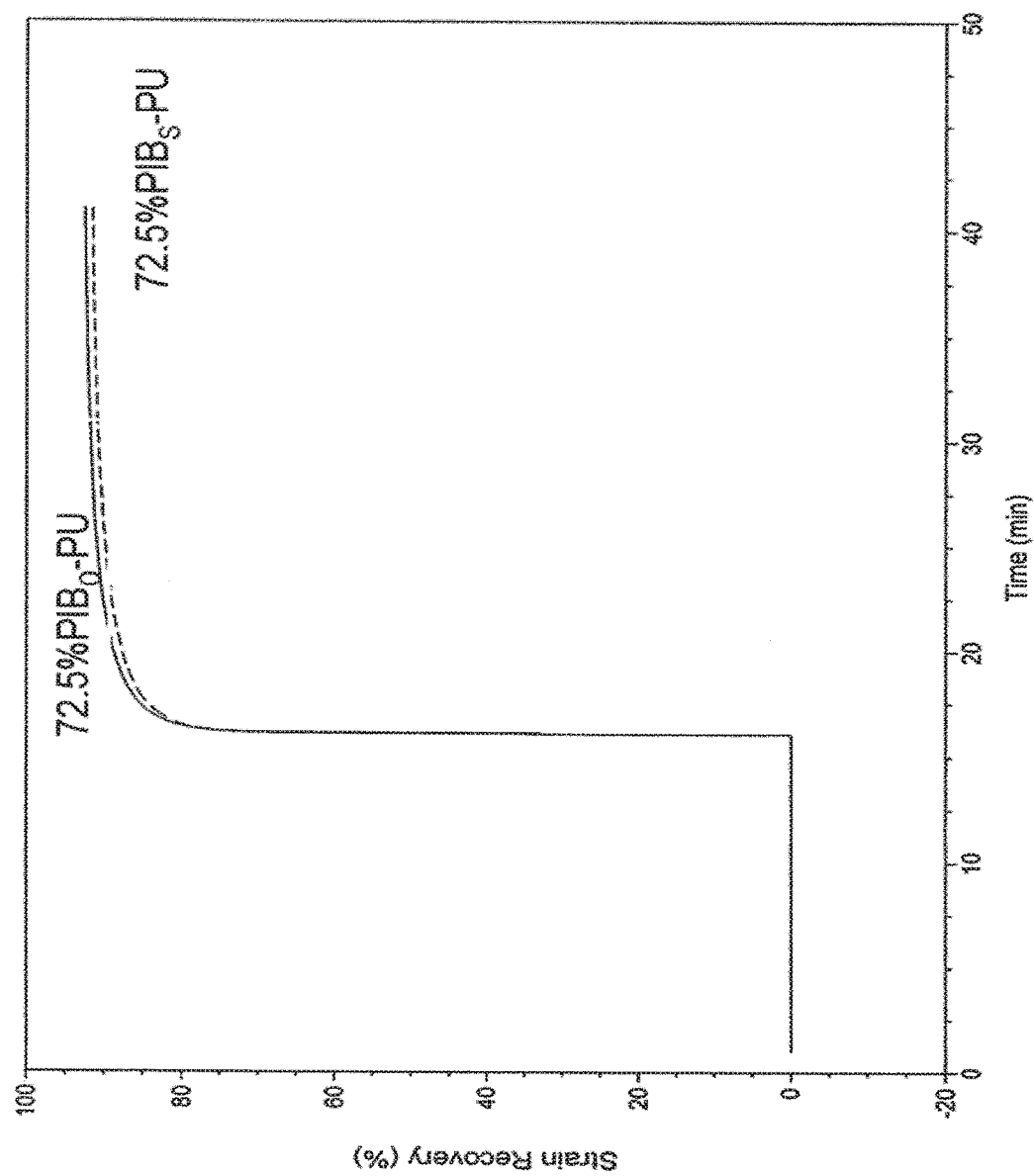
FIG. 11 is a graph showing Strain Recovery versus Time of 72.5% PIB$_O$-PU and 72.5% PIB$_S$-PU.

Strain recovery after load removal gives further insight into permanent deformation characteristics of PIB$_S$-PU polymers of various embodiments of the present invention. FIG. 11 shows very similar recoveries for both PIB-based PUs (93% and 95%), with a slightly lower recovery (93%) of PIB$_S$-PU, which may be due to the larger S somewhat retarding retraction after load removal.

Figure 12:
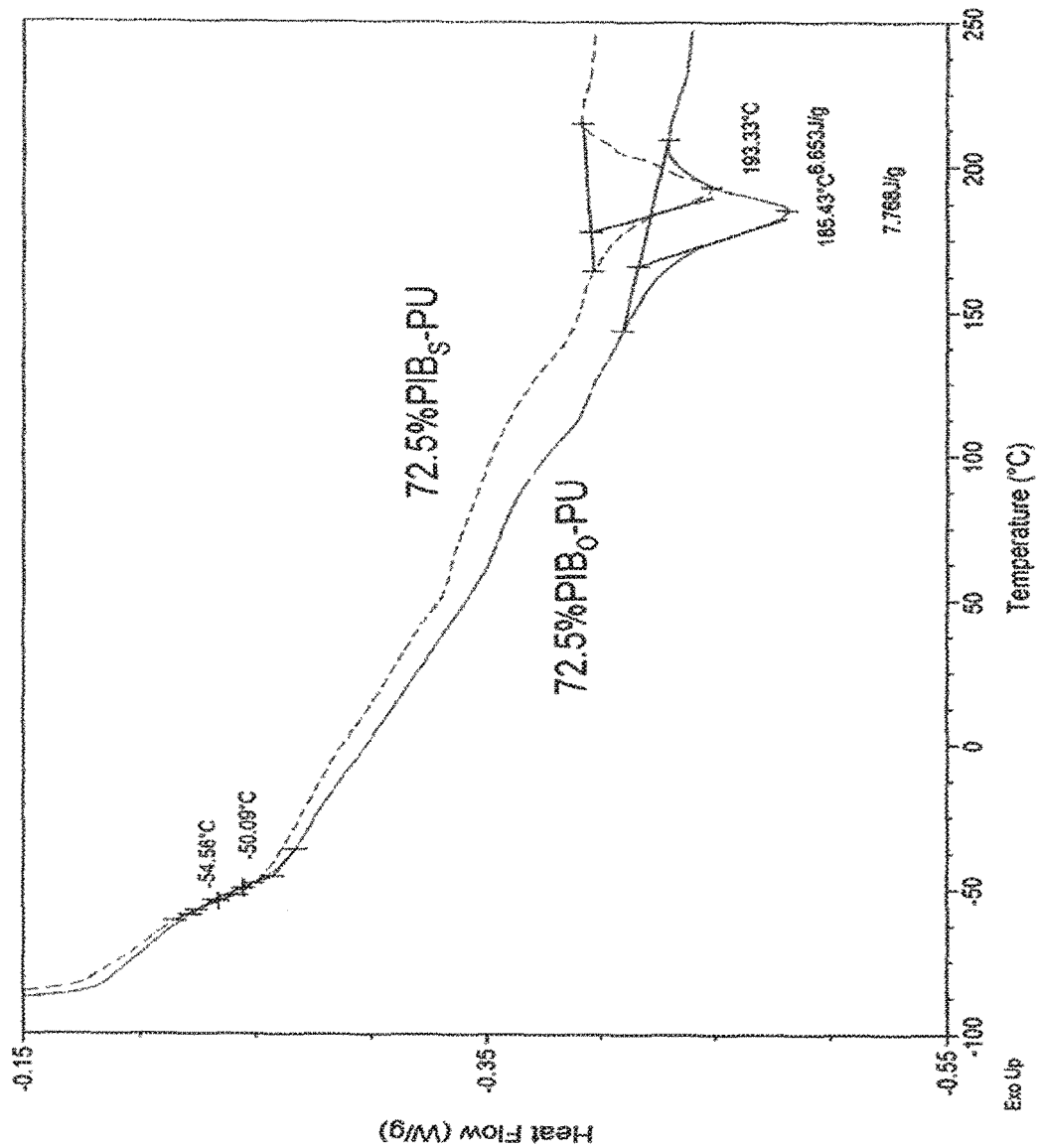
FIG. 12 is a graph showing DSC Thermograms of 72.5% PIB$_O$-PU (a) and 72.5% PIB$_S$-PU (b)

To further characterize the PIB$_S$-PUs of various embodiments of the present invention, the thermal properties of the polymers were also evaluated. FIG. 12 shows thermal transitions of 72.5PIB$_O$-PU and 72.5PIB$_S$-PU. In the presence of S atoms in the chain, soft phase transition decreases ~5° C. The less defined broad transitions in the −30 to 150° C. range suggest various intermediate hard phases, most probably in the form of random small crystals with low periodicity, corroborated by X-ray powder diffraction (XRD) and by higher degradation temperatures in thermogravimetric analysis (TGA) (See FIGS. 13, 14, discussed below).

In addition to glass transitions, crystalline melting peaks give information in regard to crystallinity and crystal sizes the $PIB_S$-PUs of various embodiments of the present invention. The slightly lower heat of fusion of $PIB_S$-PU may be due to lower periodicity and less crystalline hard domains, as suggested by XRD. See FIG. 13. The broad $T_m$ peak with shoulders also suggests random low periodicity crystals. It is further believed that the shift of $PIB_S$-PU's $T_m$ to higher temperatures may be due to melting of thicker small crystals at higher temperatures, or to restricted chain motion due to H . . . S bonding (lower degrees of freedom), or both.

Figure 13:
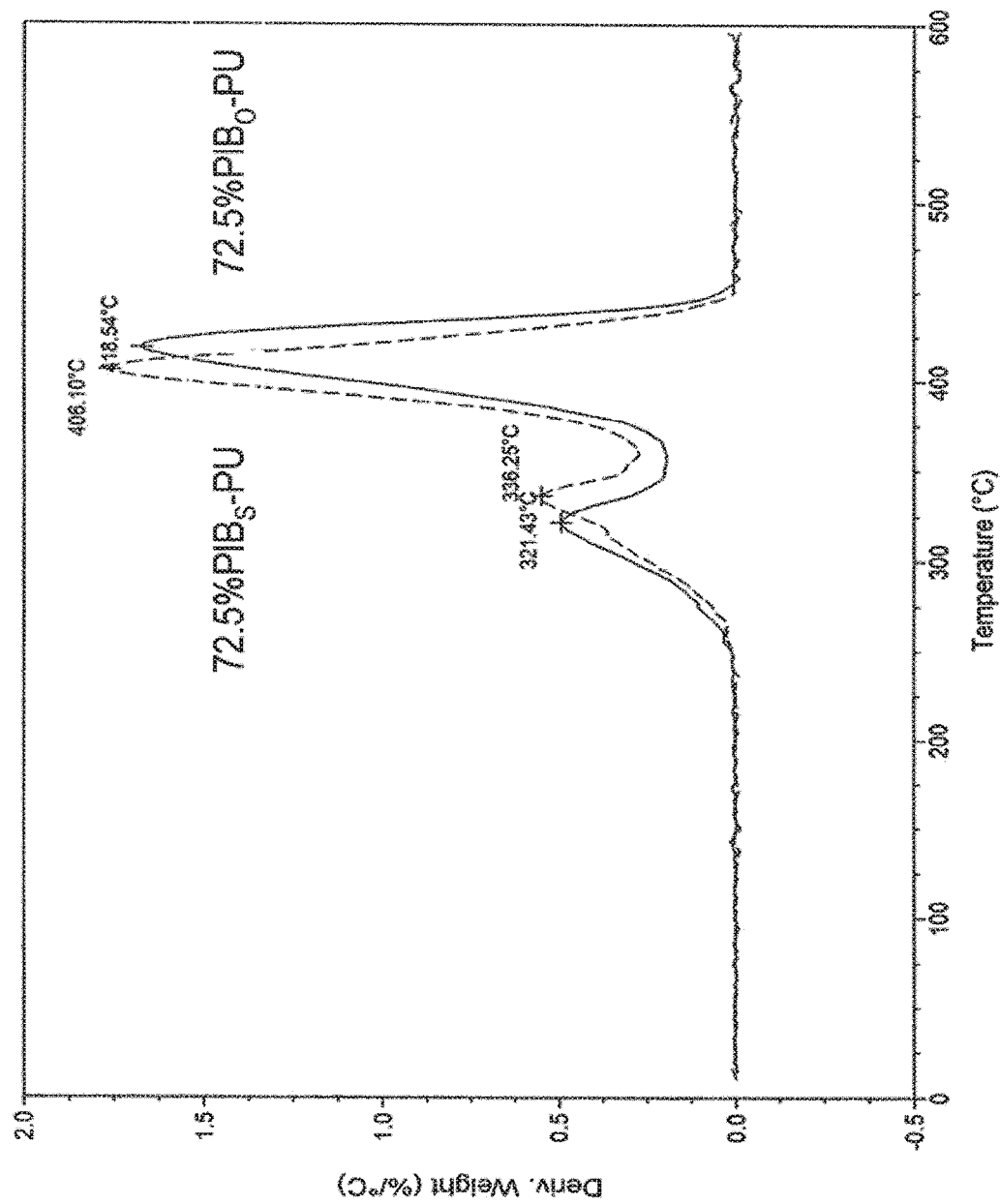
FIG. 13 is a graph showing TGA Thermograms of 72.5% PIB$_O$-PU and 72.5% PIB$_S$-PU.

FIG. 13 gives decomposition temperatures of both PIB-based PU. The peaks at 321 and 418° C. in $PIB_O$-PU are associated with the degradation of the hard polyurethane/urea phase and the soft PIB phase, respectively. It is believed that due to the presence of sulfur, hard phase degradation shifts to higher temperatures (~336° C.) most probably due to H . . . S bonding and polar interactions. It is further believed that the S in $PIB_S$-PUs increases hard phase heat stability by ~15° C. In contrast, soft phase degradation shifts to lower temperatures (~406° C.), as S—C bonds have lower bond dissociation energies than C—C bonds.

To better characterize the present invention, the hydrolytic-oxidative stability properties of select sulfur containing PIB-based PUs of the present invention were also evaluated. As used herein, the term "hydrolytic stability" refers to the ability of a substance to resist chemical decomposition (hydrolysis) in the presence of water and the term "oxidative stability" refers to the ability of a substance to resist oxidation reactions. Dogbone shaped polymer samples made of films made from select sulfur containing PIB-based PUs of the present invention were prepared and immersed the into 35 v/v % aqueous $HNO_3$ at room temperature and then the samples were shaken using a wrist shaker for 4 hours. The dogbones shaped polymer samples were next thoroughly rinsed with water, blot dried with soft tissue paper, and dried at 60° C. for ~1 day prior to mechanical testing.

For hydrolytic stability testing some of these samples were immersed in phosphate buffered saline (PBS) at pH 7.4, with osmolality and ion concentrations that match those of the human body (isotonic). Nitrogen was bubbled through the solution for ~30 minutes to minimize the presence of oxygen. The pH was monitored (by using pH paper) and remained constant at pH=7.4±0.5 over the course of experiments. Samples were aged at 50 and 85° C. (±2° C.) for five weeks. The molecular weight, polydispersity, and tensile properties of samples were measured as a function of PBS exposure time and temperature. Again, these samples were thoroughly rinsed with water, blot dried with soft tissue paper, and dried at 60° C. for ~1 day prior to mechanical testing.

The degree of oxidative/hydrolytic resistance was quantitatively assessed by determining retention of tensile strength and elongation after exposure to $HNO_3$ and PBS solution, as set forth above. The retention of tensile stress and strain (elongation) was calculated by the following formulas:

$$R\ (\%) = [\text{Tensile stress (after exposure)/Tensile stress (before exposure)}]*100;$$

and $$R\ (\%) = [\text{Elongation (after exposure)/Elongation (before exposure)}]*100.$$

The hydrolytic stability of annealed and non-annealed $PIB_S$-PU according to embodiments of the present invention was evaluated before and after immersion of the $PIB_S$-PU in PBS for twelve weeks. Table 3 summarizes static mechanical properties, hardness and stress strain retentions of 72.5$PIB_S$-PUs made with MDI and BDO after aging in aqueous PBS at pH=7.4 at 55 and 85° C.

TABLE 3

Compositions, tensile strengths and elongations of $PIB_S$-PU.

| | Before Exposure | | | After 12 Weeks at 55 and 85° C. | | |
|---|---|---|---|---|---|---|
| Tensile stress (MPa) | Elongation (%) | Young's modulus (MPa) | Hardness (Shore M) | Tensile stress (MPa) | Elongation (%) | Retention of Tensile Stress and Elongation (%/%) |
| HO-S-PIB-S-OH (72.5 wt %), MDI (21.8 wt %), BDO (5.7 wt %) - annealed | | | | | | |
| 20.7 ± 0.5 | 447 ± 25 | x | 81 | 20.7 ± 0.8 | 382 ± 28 | 100/85 at 55° C. |
| | | | | 15.4 ± 0.8 | 174 ± 6 | 74/39 at 85° C. |
| HO-S-PIB-S-OH (72.5 wt %), MDI (21.8 wt %), BDO (5.7 wt %) - not annealed | | | | | | |
| 20.7 ± 0.5 | 447 ± 25 | x | 81 | 17.9 ± 0.5 | 193 ± 43 | 86/43 at 55° C. |
| | | | | 14.4 ± 0.8 | 98 ± 8 | 66/21 at 85° C. |
| HO-S-PIB-S-OH (75 wt %), MDI (19.9 wt %), BDO (5.1 wt %) - not annealed | | | | | | |
| 20.1 ± 0.5 | 505 ± 18 | x | N/A | N/A | N/A | N/A |
| | | | | N/A | N/A | N/A |
| HO-PIB-OH (72.5 wt %), MDI (21.7 wt %), BDO (5.8 wt %) - annealed | | | | | | |
| 26.1 ± 0.6 | 492 ± 08 | 16 | 76 | 23.5 ± 0.3 | 454 ± 14 | 90/92 at 55° C. |
| | | | | 15.0 ± 0.3 | 282 ± 10 | 57/57 at 85° C. |
| Elast-Eon™ E2A - annealed | | | | | | |
| 30.6 ± 1.1 | 436 ± 20 | 38 | 89 | 21.1 ± 0.2 | 298 ± 3 | 69/68 at 55° C. |
| | | | | 14.4 ± 0.2 | 166 ± 8 | 47/38 at 85° C. |

Due to its somewhat lower hard segment content (22.5 vs 39%), the tensile strength of 72.5% $PIB_S$-PU was found to be lower than that of Elast-Eon™ E2A. Surprisingly, the tensile stress of $PIB_S$-PU was found to be somewhat lower than that of PIB$_O$-PU. Both PIB$_S$-PU and PIB$_O$-PU show significantly better property retentions at 55 and 85° C. than E2A. (See Table 3)

As can be seen from Table 3, annealing dramatically increases the hydrolytic stability of PIB$_S$-PU, the effect being even more pronounced than for PIB$_O$-PUs. While not to be bound by theory, it is believed that effect is likely due to increased surface hydrophobicity upon prolonged heating, which enhances the protection of hydrolytically-oxidatively vulnerable carbamate bonds by inert PIB barriers. As H . . . S bonds are known to be weaker than H . . . O bonds, the effect of annealing would be expected to be more pronounced with PIB$_S$-PU than for PIB$_O$-PU.

Figure 15:
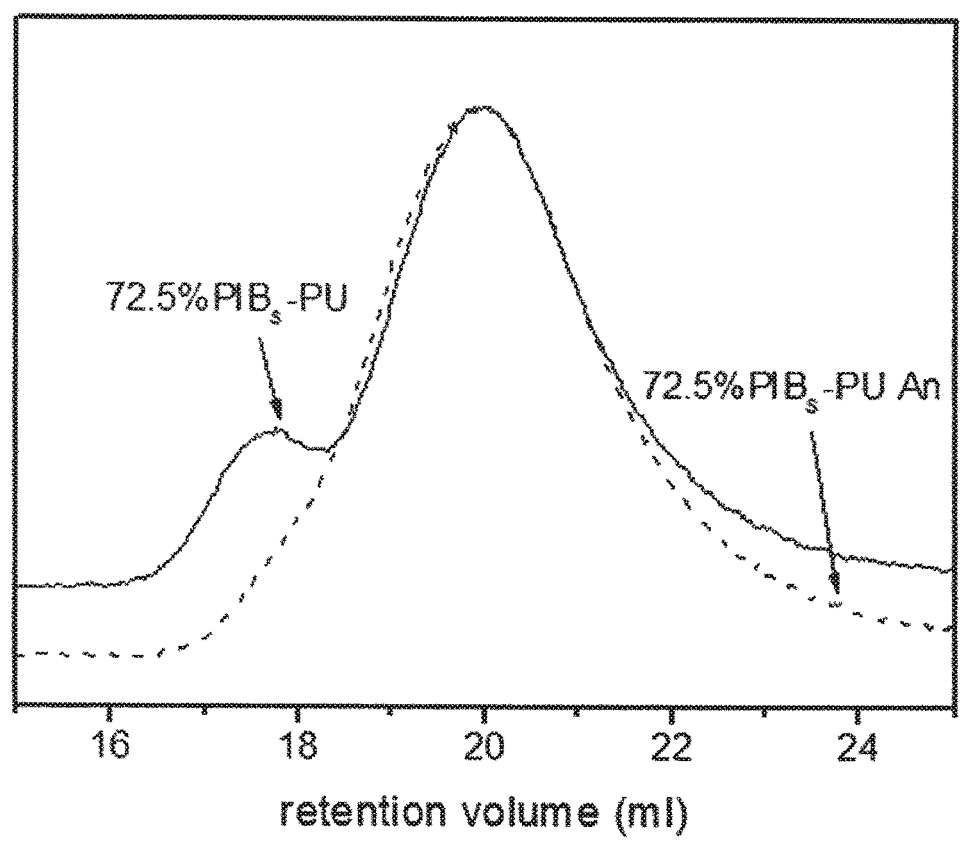
FIG. 15 is a graph showing GPC traces of 72.5% PIB$_S$-PU before and after annealing.

FIG. 15 shows GPC traces of 72.5% PIB$_S$-PUs before and after annealing. The striking difference between the traces is the presence of allophanates (indicated by the hump at ~17.5 mL) in the unannealed material, which disappear after annealing. It will be appreciated that allophanates are often observed in PU syntheses, particularly when the NCO/OH ratio is not exactly unity. The reaction is reversible and allophanates can be eliminated by heating PUs to 110-120° C. for several hours or by compression molding at high temperatures.

Figure 16:
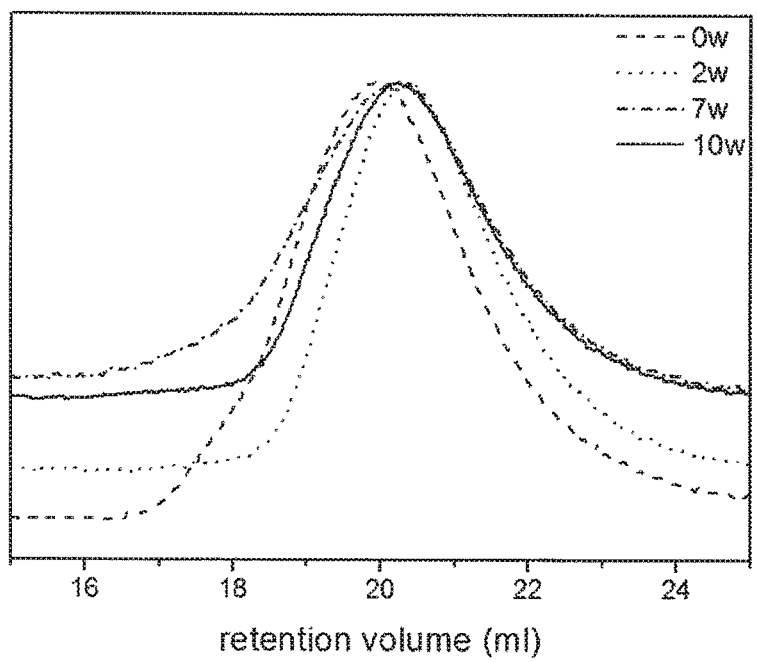
FIG. 16 is a graph showing GPC traces of 72.5% PIB$_S$-PU after various aging times in PBS at 55° C.
Figure 17:
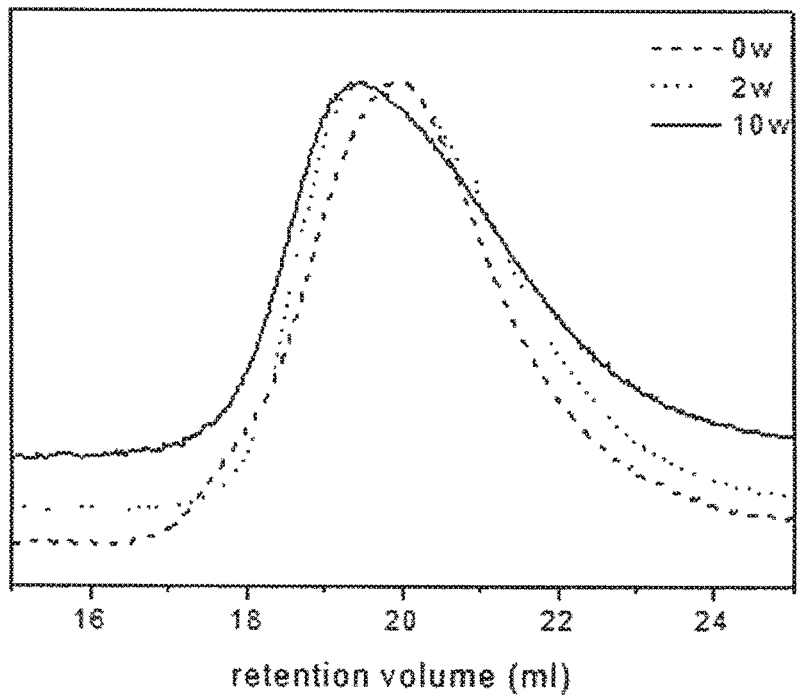
FIG. 17 is a graph showing GPC traces of 72.5% PIB$_S$-PU (a) after various aging times in PBS at 85° C.

FIGS. 16, 17 show GPC traces of unannealed PIB$_S$-PU immersed in PBS at 55 and 85° C., respectively, for several weeks. As time progresses the traces become more asymmetric and move towards higher molecular weights, which suggest branching due to allophanates, also observed in PIB$_O$-PUs. As set forth above, allophanate formation is likely due to the slightly higher than unity NCO/OH ratio (i.e., 1.06) used. Indeed, after several weeks in PBS the samples became gradually insoluble in THF, due to branching followed by crosslinking. For these reasons we do not present molecular mass vs time profiles and the reaction rate constant of hydrolysis even at 55° C.

Another difference between PIB$_S$-PU and PIB$_O$-PU is that the former exhibits better strain retention while the latter shows better stress retention. This may be due to oxidation of —S— in PIB$_S$-PU to sulfoxides (~84%) and sulfones (~16%) detected after immersion in PBS that produce additional H bonds and thus stiffen PIB$_S$-PU. Unreacted sulfide could not be detected after 12 weeks in PBS at 85° C. Oxidation during aging in PBS may occur if deoxygenation by bubbling N$_2$ of PBS was incomplete.

The shifting of GPC traces toward higher retention volumes (See FIG. 16) indicates molecular weight degradation. While this shift is modest for PIB$_S$-PIB, it is pronounced for E2A, confirming the hydrolytic vulnerability of E2A.

Oxidative resistances of PIB$_S$-PU according to one or more embodiments of the present invention and E2A were also studied by immersing various PU samples in 50 v/v % HNO$_3$ for 4 h at room temperature (Table 4). Exposure to nitric acid caused less damage to PIB$_S$-PU than to E2A, i.e., PIB$_S$-PU showed >80% stress and ~60% strain retention, whereas E2A showed only 50 and 52% retentions. The stress retentions of PIB$_S$-PU and PIB$_O$-PU are similar, although the latter shows better strain retention. These Results indicate that both PIB$_S$-PU and PIB-PU are more resistant to hydrolytic and oxidative degradation than E2A.

TABLE 4

Tensile properties of 72.5PIB$_S$—PU, 72.5PIB$_O$—PU, and Elast-Eon ™ before and after exposure to HNO$_3$ for 4 h at room temperature.

| Before Exposure | | After Exposure | | Retention of Tensile |
|---|---|---|---|---|
| Tensile stress (MPa) | Elongation (%) | Tensile stress (MPa) | Elongation (%) | Stress and Elongation (%/%) |
| HO—S—PIB—S—OH (72.5 wt %), MDI (21.8 wt %), BDO (5.7 wt %) | | | | |
| 20.7 ± 0.5 | 447 ± 25 | 16.7 | 280 | 81/63 |
| HO—PIB—OH (72.5 wt %), MDI (21.7 wt %), BDO (5.8 wt %) | | | | |
| 26.1 ± 0.6 | 526 ± 20 | 21.3 ± 0.4 | 478 ± 21 | 82/91 |
| Elast-Eon ™ E2A | | | | |
| 30.6 ± 1.1 | 436 ± 20 | 15.2 ± 0.1 | 226 ± 7 | 50/52 |

Similarly, Table 5 shows the oxidative stability of 60PIB$_S$-PU, 70PIB$_S$-PU, 60PIB$_O$-PU and polydimethylsiloxane (PDMS) based (Elast-Eon™) PU samples before and after exposure to HNO$_3$. As can be seen, the PIB based samples showed better retention of tensile properties than Elast-Eon™. The specimen containing 70 wt % HO—S-PIB-S—OH displayed exceptional stability, retaining more than 90% of its original values.

TABLE 5

Tensile properties of HO-S-PIB-S-OH based, HO-PIB-OH based and PDMS based (Elast-Eon ™) PU samples before and after exposure to 35 v/v % HN03 at room temperature for 4 hours

| Sample | PIB (wt %) | PDMS (wt %) | Before Exposure | | After 4 h Exposure to 35 v/v % HNO$_3$ | | Retention of Tensile |
|---|---|---|---|---|---|---|---|
| | | | Tensile stress (MPa) | Elongation (%) | Tensile stress (MPa) | Elongation (%) | Stress and Elongation (%/%) |
| HO-S-PIB-S-OH (60 wt %), HMDI (23 wt %), HDO (5 wt %), BG9 (12 wt %) | 60 | 0 | 26.6 ± 0.4 | 679 ± 25 | 15.6 | 671 | 59/99 |
| HO-S-PIB-S-OH (70 wt %), HMDI (19 wt %), HDO (5 wt %), BG9 (6 wt %) | 70 | 0 | 16.6 ± 0.4 | 604 ± 17 | 15.1 ± 0.6 | 584 ± 4 | 91/97 |

TABLE 5-continued

Tensile properties of HO-S-PIB-S-OH based, HO-PIB-OH based
and PDMS based (Elast-Eon ™) PU samples before and after
exposure to 35 v/v % HN03 at room temperature for 4 hours

| | | | Before Exposure | | After 4 h Exposure to 35 v/v % HN0$_3$ | | Retention of Tensile |
|---|---|---|---|---|---|---|---|
| Sample | PIB (wt %) | PDMS (wt %) | Tensile stress (MPa) | Elongation (%) | Tensile stress (MPa) | Elongation (%) | Stress and Elongation (%/%) |
| HO-PIB-OH (60 wt %), HMDI (22 wt %), HDO (6 wt %), BG9 (12 wt %) | 60 | 0 | 28.4 ± 4.6 | 646 ± 39 | 16.8 ± 1.2 | 527 ± 27 | 59/81 |
| Elast-Eon ™ E2A | 0 | 49 | 30.6 ± 1.1 | 436 ± 20 | 15.2 ± 0.1 | 226 ± 7 | 50/52 |

Figure 18:
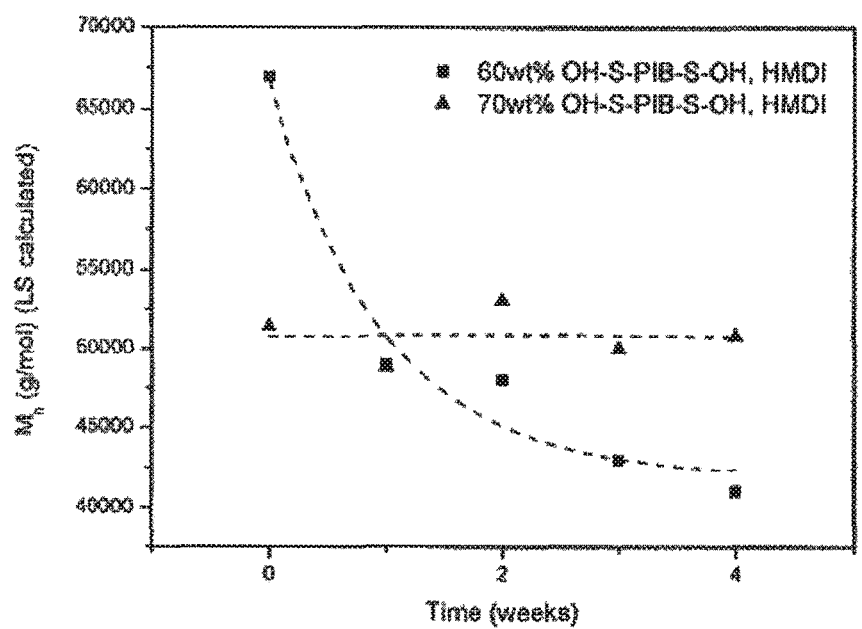
FIG. 18 is a graph showing the absolute M$_n$ (determined by GPC (LS)) of two HO—S-PIB-S—OH based PUs versus aging time at 50° C. in pH=7.4 PBS.

FIG. 18 shows molecular mass versus time profiles (aging) of two HO—S-PIB-S—OH based PUs at 50° C. The molar mass reduction for the 60 wt % OH—S-PIB-S—OH based sample is likely due to hydrolytic cleavage of the segmented PU backbone. The 70 wt % HO—S-PIB-S—OH based PU exhibited no molar mass reduction during the first 4 weeks of the study, which suggests that 70 wt % sulfur containing PIB effectively shields the vulnerable urethane bonds and protects them from hydrolysis. It has been reported that the commercially available PU Elast-Eon™ degrades even after two weeks of incubation in PBS solution. See, Chaffin, K. A.; Buckalew, A. J.; Schley, J. L; Chen, X.; Jolly, M.; Alkatout, J. A.; Miller, J. P.; Untereker, D. F.; Hillmyer, M. A.; Bates, F. S. Macromolecules 2012, 45, 9110-9120, the disclosure of which is incorporated herein by reference in its entirety.

It should also be appreciated that while there may be PUs known in the art that contain sulfur in a side chain, the PIB-based PUs of the present invention have sulfur atoms in their polymer backbone. As used herein, the term "polymer backbone" refers to the series of covalently bound atoms that together create the continuous chain of the polymer molecule, and does not include any side chains that may be present. It is believed that the S—C bonds in the backbone of the PIB-based PUs of the present invention are not susceptible to hydrolysis by acids and provide a PU that is unexpectedly biostable. As used herein, the term "biostable" refers to a substance having a resistance to the deleterious action of living systems that allows essentially complete preservation of the initial characteristics of the substance. The hydrolytic-oxidative stability of the sulfur containing PIB-based PUs of the present invention has been found to be superior to Elast-Eon™, the gold standard of commercially available PUs currently marketed for chemical stability. (See Table 5, above.

Figure 14:
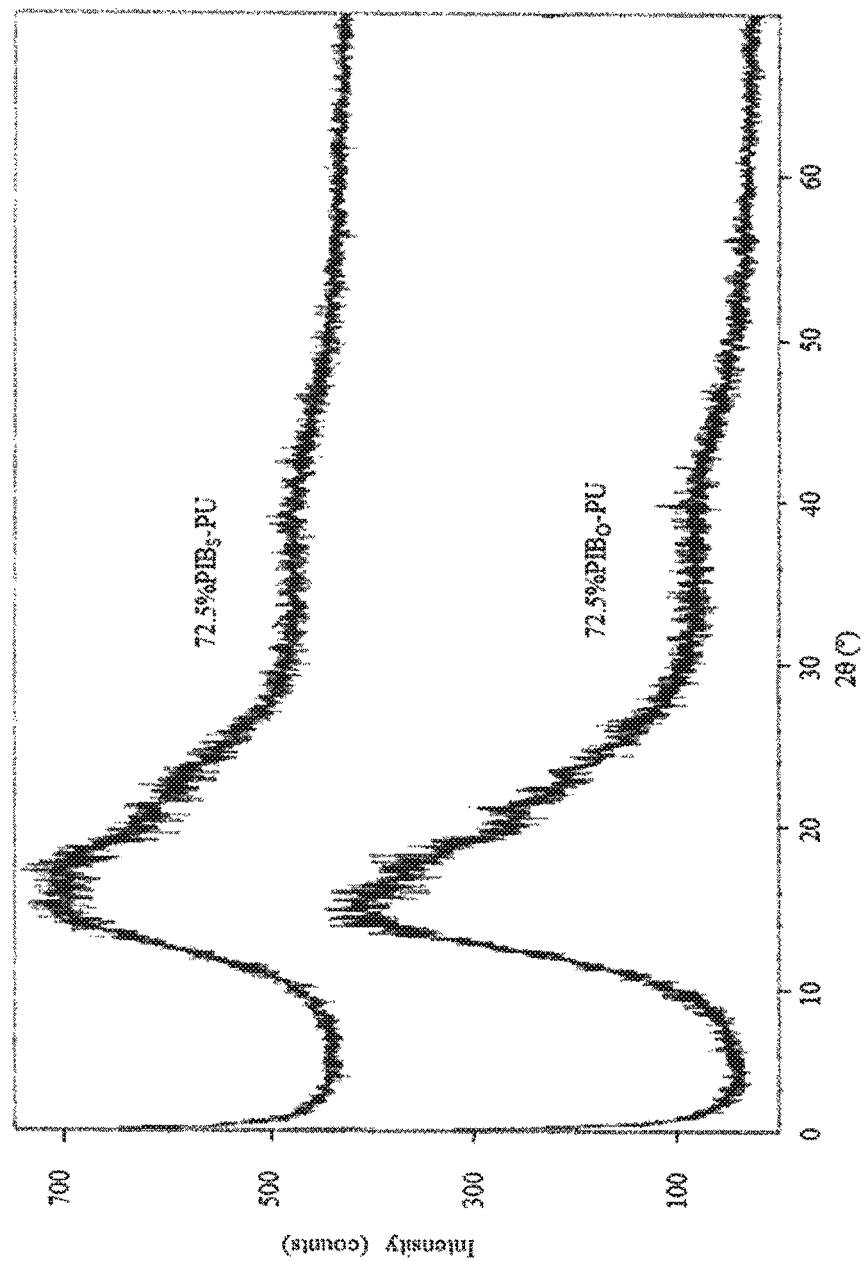
FIG. 14 is a graph showing XRD traces of 72.5% PIB$_O$-PU and 72.5% PIB$_S$-PU.

FIG. 14 depicts XRD traces of PIB$_O$-PU and PIB$_S$-PUs according to one or more embodiments of the present invention. PIB$_S$-PU shows a broader peak with a shoulder with intensities lower than those exhibited by PIB$_O$-PU. The peaks in the 14-20° range and ~40° 2θ indicate self-organization of hard domains. The narrower tall XRD peak of PIB$_O$-PU suggests larger crystallites, while PIB$_S$-PU shows broader less intense peaks indicating random low periodicity crystals. It seems that the H bonded larger S atoms disturb crystallinity, as is also suggested by differential scanning calorimetry (DSC) (see FIG. 12). It is believed that lower hard domain periodicity and domain size reduces mechanical strength and the H . . . S bonds reduce extensibility (see also FIG. 7).

The surface properties of PIB$_S$-PUs according to one or more embodiments of the present invention were evaluated by energy dispersive X-ray spectroscopy (EDX) coupled with scanning electron microscopy (SEM) provide elemental analysis at the nanometer scale. Dispersion of S atoms on film surfaces was further studied by S-mapping. Elemental composition and distribution of C, O, and S atoms at surfaces dearly demonstrated homogeneous dispersion of S atoms.

In a fourth aspect, embodiments of the present invention are directed to a method for making the sulfur containing, hydrolytically and oxidatively resistant, biocompatible and biostable PIB-based PUs described above. In some embodiments, the method begins by preparing the sulfur containing the HO—S-PIB-S—OH polymer described above and combining it with an isocyanate and a suitable solvent, such as tetrahydrofuran (THF), in a suitable container under a inert, e.g., nitrogen, atmosphere and heating the combination to a temperature of from about 50° C. to about 70° C. Any isocyanate known in the art for forming PUs may be used. In some embodiments, the isocyanate may be, without limitation, 4,4'-methylenebis(phenyl isocyanate) (MDI), 4,4'-methylenebis(cyclohexyl isocyanate) (HMDI), and combinations thereof. One of ordinary skill in the art will be able to select a suitable solvent for the HO—S-PIB-S—OH and isocyanate without undue experimentation. In some embodiments, the solvent may be tetrahydrofuran (THF). One of ordinary skill in the art will likewise be able to select a suitable inert atmosphere without undue experimentation. In some embodiments, the inert atmosphere may be a nitrogen gas atmosphere. In some embodiments, the combination may be heated to a temperature of about 60° C.

Next, a catalyst, such as dibutyltin dilaurate, is added to the mixture and it is stirred to produce a prepolymer comprising the residues of the HO—S-PIB-S—OH and isocyanate and having isocyanate end groups. While dibutyltin dilaurate is used as a catalyst in the embodiment described above, the invention is not so limited and any suitable catalyst known in the art for this purpose may be used. As used herein, the term prepolymer refers to a substance that represents an intermediate stage in the polymerization. As will be appreciated by those in the art, these prepolumers are themselves diisocyanates and will generally react like a diisocyanate. When compared with the original diisocyanates described above, these prepolymers will generally have a greater molecular weight, a higher viscosity, a lower isocyanate content by weight (% NCO), and a lower vapor pressure. In some embodiments, the prepolymer may have the formula:

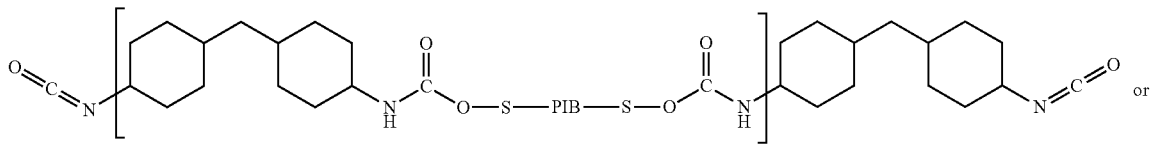

Formula IV

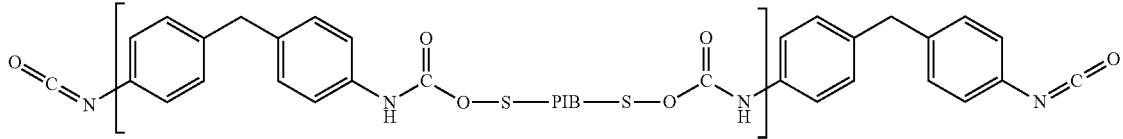

Formula V

Again, it should be appreciated that the residue of the HO—S-PIB-S—OH in the prepolymers shown in Formulas IV and V contain a $CH_2CH_2$ group between each sulfur and oxygen molecule that is not shown.

Last, the chain extenders are dissolved in suitable deoxygenated solvents and reacted with the prepolymer to produce a sulfur containing PIB-based PU according to one or more embodiment of the present invention. Any of the various chain extenders known in the art for this purpose may be used. In some embodiments, the chain extender may be a short chain diol, hexamethylene diol (HDO), poly(tetrahydrofuran) (BG9), or combinations thereof. One of ordinary skill in the art will be able to select a suitable deoxygenated solvent for chain extenders without undue experimentation. In some embodiments, the solvent may be tetrahydrofuran (THF).

Scheme 2 outlines the strategy for the preparation of $PIB_S$-PU by the use of HO—S-PIB-S—OH plus a conventional diisocyanate (MDI) and chain extender (BDO). Cast films were optically clear, colorless or slightly yellow and odorless.

Scheme 2

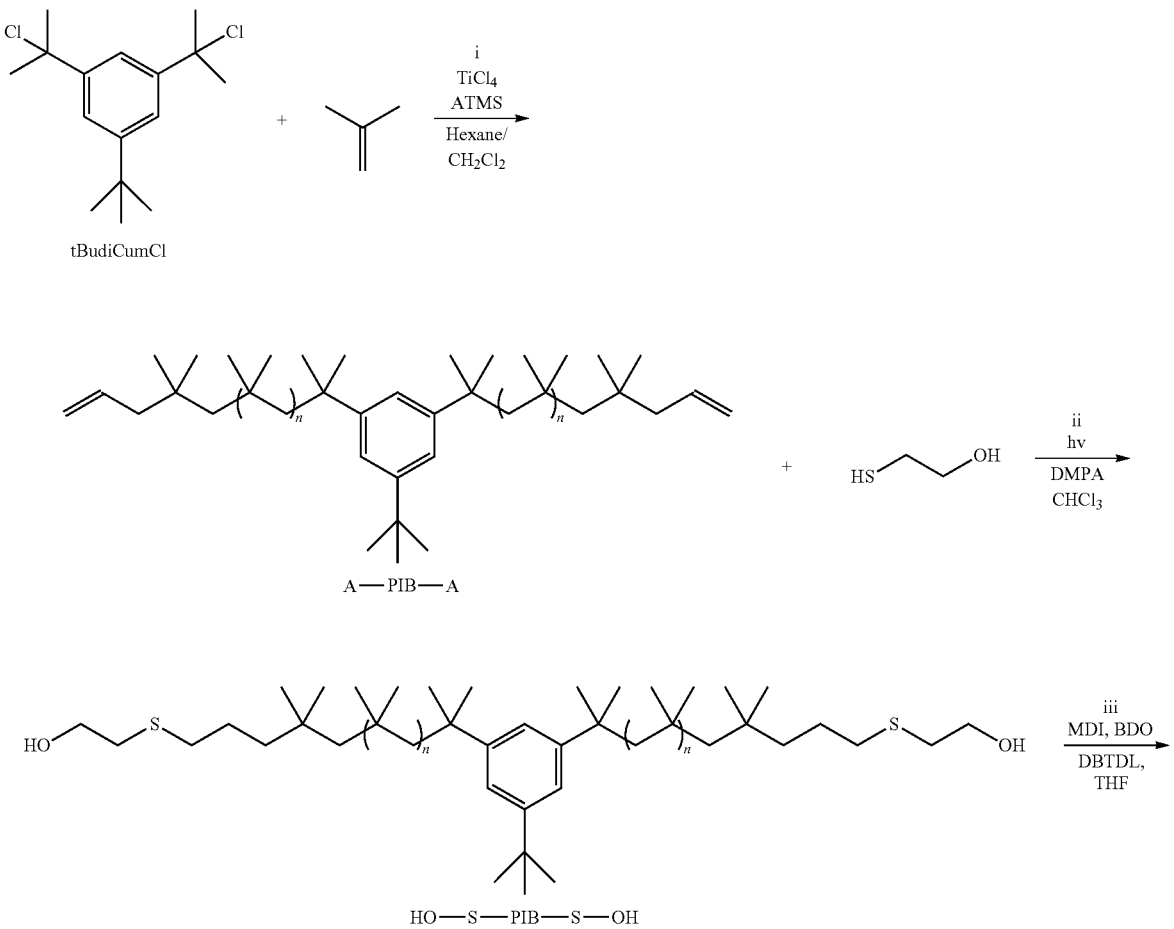

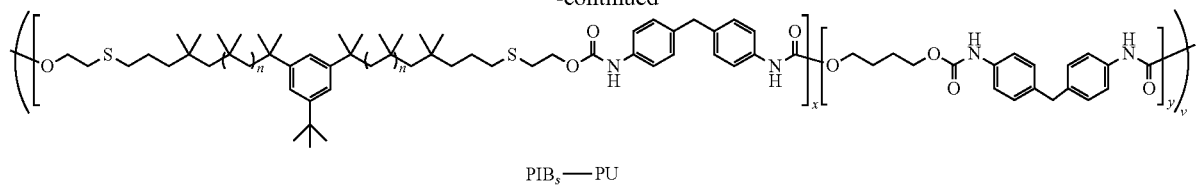

PIB$_s$—PU

Scheme 3, below outlines a synthetic strategy for the preparation of PUs starting from HO—S-PIB-S—OH and either 4,4'-methylenebis(phenyl isocyanate) (MDI) or 4,4'-methylenebis(cyclohexyl isocyanate) (HMDI) along with BG9 and HDO as chain extenders, according to one or more embodiment of the present invention.

Scheme 3
Synthesis of HO-S-PIB-S-OH based polyurethane using either HMDI or MDI as the diisocyanate with BG9 and HDO as chain extenders

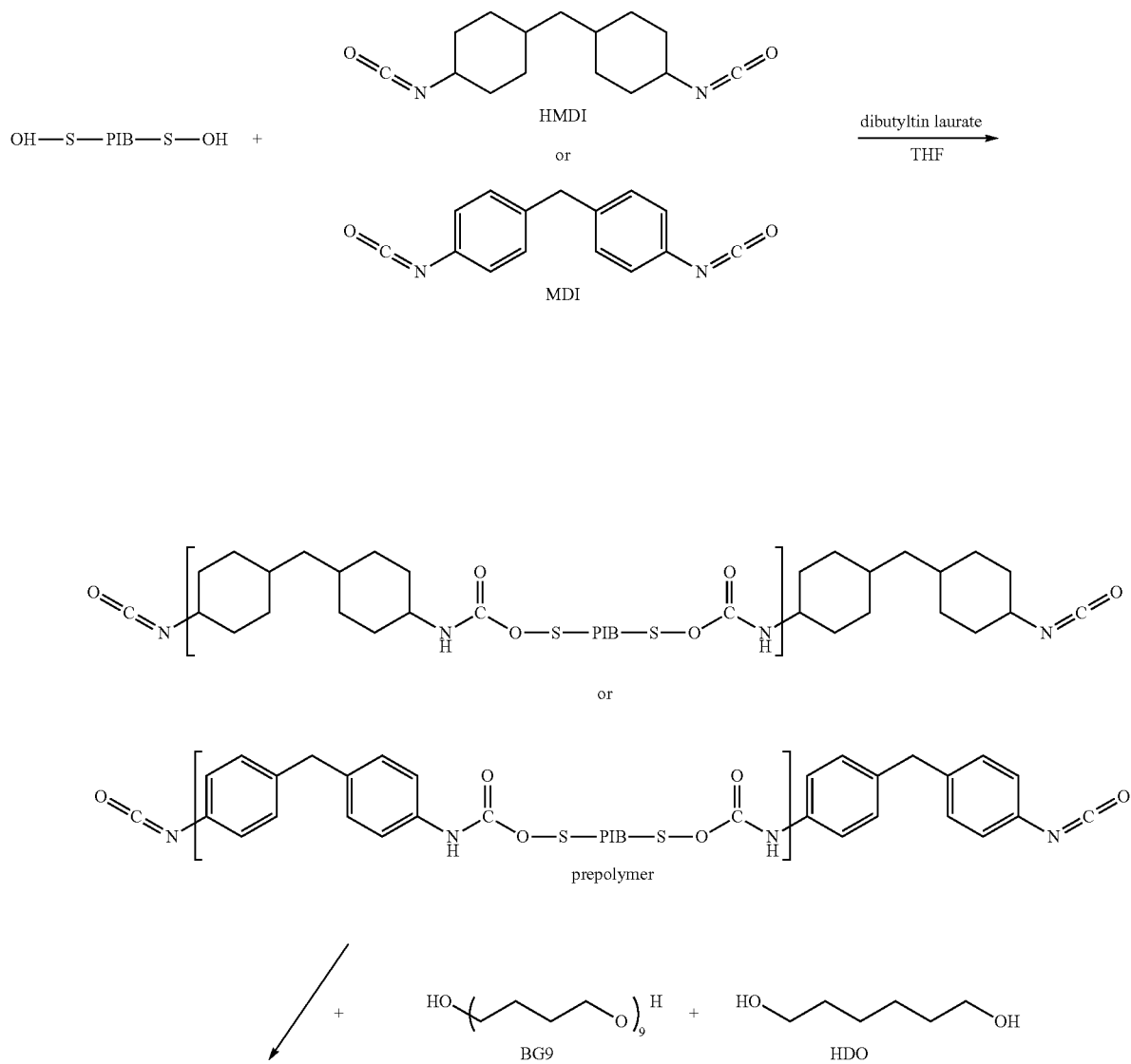

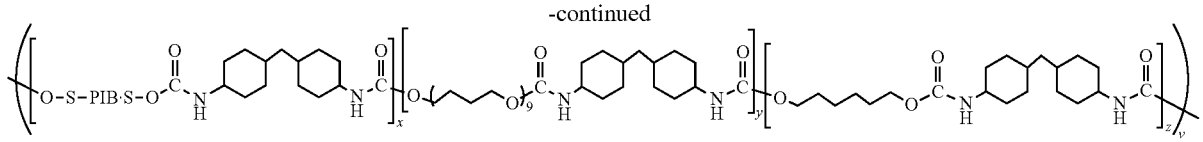

or

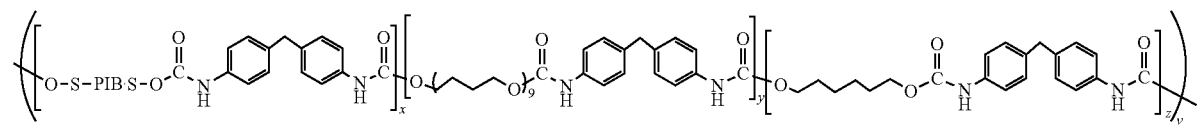

As shown in Scheme 3, x is an integer from about 5 to about 100; y is an integer from about 5 to about 100; z is an integer from about 5 to about 100; v is an integer from about 5 to about 100; and there are two (and in some cases, up to 8) additional carbon atoms between each sulfur atom bonded to the PIB chain and the adjacent oxygen atom. Analyses indicated negligible amounts of unreacted diisocyanates and diols remaining in synthesis charges.

In some embodiments, x may be an integer from about 5 to about 90. In some embodiments, x may be an integer from about 5 to about 75. In some embodiments, x may be an integer from about 5 to about 50. In some embodiments, x may be an integer from about 5 to about 25. In some embodiments, x may be an integer from about 5 to about 10. In some embodiments, x may be an integer from about 15 to about 100. In some embodiments, x may be an integer from about 25 to about 100. In some embodiments, x may be an integer from about 50 to about 100. In some embodiments, x may be an integer from about 75 to about 100. In some embodiments, x may be an integer from about 15 to about 80. In some embodiments, x may be an integer from about 25 to about 75.

In some embodiments, y may be an integer from about 5 to about 90. In some embodiments, y may be an integer from about 5 to about 75. In some embodiments, y may be an integer from about 5 to about 50. In some embodiments, y may be an integer from about 5 to about 25. In some embodiments, y may be an integer from about 5 to about 10. In some embodiments, y may be an integer from about 15 to about 100. In some embodiments, y may be an integer from about 25 to about 100. In some embodiments, y may be an integer from about 50 to about 100. In some embodiments, y may be an integer from about 75 to about 100. In some embodiments, y may be an integer from about 15 to about 80. In some embodiments, y may be an integer from about 25 to about 75.

In some embodiments, z may be an integer from about 5 to about 90. In some embodiments, z may be an integer from about 5 to about 75. In some embodiments, z may be an integer from about 5 to about 50. In some embodiments, z may be an integer from about 5 to about 25. In some embodiments, z may be an integer from about 5 to about 10. In some embodiments, z may be an integer from about 15 to about 100. In some embodiments, z may be an integer from about 25 to about 100. In some embodiments, z may be an integer from about 50 to about 100. In some embodiments, z may be an integer from about 75 to about 100. In some embodiments, z may be an integer from about 15 to about 80. In some embodiments, z may be an integer from about 25 to about 75.

In some embodiments, v may be an integer from about 5 to about 90. In some embodiments, v may be an integer from about 5 to about 75. In some embodiments, v may be an integer from about 5 to about 50. In some embodiments, v may be an integer from about 5 to about 25. In some embodiments, v may be an integer from about 5 to about 10. In some embodiments, v may be an integer from about 15 to about 100. In some embodiments, v may be an integer from about 25 to about 100. In some embodiments, v may be an integer from about 50 to about 100. In some embodiments, v may be an integer from about 75 to about 100. In some embodiments, v may be an integer from about 15 to about 80. In some embodiments, v may be an integer from about 25 to about 75.

The PU films made with HO—S-PIB-S—OH are generally colorless (optically transparent) whereas the corresponding PIB$_O$-PU yields yellow films. The products were characterized by $^1$H-NMR spectroscopy and GPC. (See FIGS. 1-4) The results indicate the formation of PUs with negligible amounts of unreacted diisocyanates and diols remaining in the system. The molecular weight distributions obtained were significantly narrower (PDI*=1.3) than those of commercially available PUs (Elast-Eon™ (PDI=1.6-1.9)). GPC traces showed no sign of allophanate formation (i.e., absence of a shoulder at high molecular masses often observed in commercial PU.

In light of the foregoing, it should be appreciated that the present invention significantly advances the art by providing a novel sulfur containing, hydroxyl-telechelic PIBs, and hydrolytically and oxidatively resistant, biocompatible and biostable polyurethanes (PUs) made therefrom, as well as methods for making both that are structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

The following examples are offered to more fully illustrate the invention, but are not to be construed as limiting the scope thereof. Further, while some of examples may include conclusions about the way the invention may function, the inventor do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Example 1

Synthesis of Allyl Telechelc PIB (A-PIB-A)

Tert-butyl-dicumyl chloride (tBudiCumCl) was recrystallized from hexane under a $N_2$ atmosphere prior to use (According to $^1$H NMR spectroscopy, this initiator contained ~0.2% double bonded impurities, and <1% hexane after recrystallization). $CH_2Cl_2$ (310 ml) and hexane (510 ml) were injected into a 2 liter three neck round bottom flask equipped with a magnetic stirrer, thermometer and $N_2$ inlet. Next, the tBudiCumCl (2.136 g, 7.434 mmol) and TMEDA (2.2 ml, 15 mmol) were added to the $CH_2Cl_2$ and hexane, and the mixture was cooled to −78° C. with isopropanol/dry ice mixture under a continuous $N_2$ stream. Isobutylene (IB) (26.3 ml, 356 mmol) was then injected into the reaction mixture and $TiCl_4$ (12.9 ml, 118 mmol) was added to start polymerization. After 15 minutes allyltrimethylsilane (11.7 ml, 74 mmol) was added to terminate the reaction, and the system was stirred for 45 minutes. The reaction was then quenched with MeOH (~200 ml) and $NaHCO_3$ solution (~200 ml). The organic phase was separated and washed with $NaHCO_3$ solution and water. The crude product was dried over $MgSO_4$, filtered, the solvent evaporated, and the polymer was dried under reduced pressure. The product was a colorless oil (21.2 g, yield=95.5%), which was characterized by $^1$H-NMR spectroscopy and gel permeation chromatography (GPC).

Figure 19:
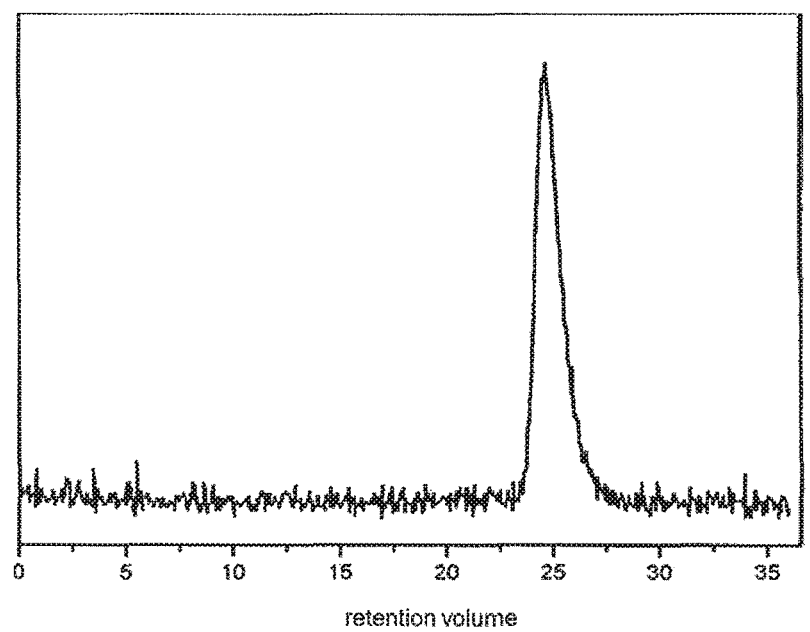
FIG. 19 is a GPC Chromatogram of A-PIB-A.

The resonances in the $^1$H-NMR spectrum indicated the presence of the allyl end-group (centered at 5.06 and 5.88 ppm) and methylene protons (doublet at 2.01 ppm) of the PIB adjacent to the end group. The molecular weight and functionality calculated from $^1$H-NMR data were 3100 g/mol and close to 100%, respectively. The GPC chromatogram showed monomodal molecular weight distribution with a polydispersity index (PDI) of 1.02 (See FIG. 19).

Example 2

Preparation of OH—S-PIB-S—OH from A-PIB-A Via Thiol-Ene Click Reaction

The A-PIB-A of Example 1, above (10.955 g, 3.534 mmol), 2,2-dimethoxy-2-phenylacetophenone (DMPA) (102 mg, 0.398 mmol) and chloroform (non-distilled, 18.8 ml) were placed into a 50 ml round bottom flask and stirred in the dark until all the A-PIB-A dissolved. Then, (i) mercaptoethanol (0.75 ml, 11 mmol) was injected; (ii) the mixture was stirred for a few minutes; and (iii) irradiated with a medium pressure Hg lamp (Fusion UV Inc. F300S) for 15 minutes, while the flask was cooled with an ice-water bath. The solvent was removed under reduced pressure; the crude mixture was then dissolved in hexane, and precipitated three times into methanol. The product was then redissolved in hexane, washed with water, dried over $MgSO_4$, filtered and dried. The product, a colorless oil (10.6 g, yield=92.7%), was characterized by $^1$H-NMR and $^{13}$C-NMR spectroscopy, and gel permeation chromatography.

The resonances in the $^1$H-NMR spectrum indicated the total absence of allyl protons and the new resonance signals correspond to the desired product: the OH protons appear at 2.12 ppm (2H, t, J=6.0 Hz), the methylene protons adjacent to the sulfur appear at 2.49 ppm (4H, t, J=7.0 Hz) and 2.74 ppm (4H, t, J=6.0 Hz), respectively, while the methylene protons adjacent to the OH appear at 3.73 ppm (4H, dt, J=6.0, 6.0 Hz). The molecular weight and the functionality calculated from $^1$H-NMR data were 3370 g/mol and near 100%, respectively.

The $^{13}$C-NMR spectrum was consistent with the proposed structure (See FIG. 2). The methylene carbons adjacent to the sulfur appear at 24.77 ppm and 29.42 ppm, respectively, while the methylene carbons adjacent to the OH appear at 60.18 ppm close to the methylene protons of the PIB chain (59.55 ppm). The GPC chromatogram showed monomodal molecular weight distribution with a PDI of 1.02 (See FIG. 3).

Example 3

The Synthesis of PUs Containing OH—S-PIB-S—OH (60 wt %), HMDI, BG9 and HDO

The HO—S-PIB-S—OH of Example 2 (1.2469 g, 0.3730 mmol) and 4,4'-Methylenebis(cydohexyl isocyanate) (HMDI) (0.4860 g, 1.8525 mmol) were placed into a 20 ml glass vial and the system was deoxygenated by evacuating the air with vacuum and replacing it with nitrogen. THF (3 ml) was then injected, the solution was heated to 60° C. Dibutyltin dilaurate (DBTDL) catalyst (11.7 mg, 0.019 mmol-0.22 ml of 50 mg/ml THF solution) was then added, and the solution stirred for 1 hour to obtain the 'prepolymer'. A solution containing hexamethylene diol (HDO, (0.1099 g, 0.9300 mmol) and poly(tetrahydrofuran) with Mn~650 g/mol (BG9) (0.2426 g, 0.3732 mmol) dissolved in 2 ml THF was separately prepared and deoxygenated, and then injected into the prepolymer solution (the vial was washed with 1 ml of THF). The system was stirred for 4 h at 60-65° C. Approximately 2 ml of THF was added while the solution was warm, and the system poured into a 7.4×8.1 cm glass mold. The solvent was evaporated and the film dried at 60° C. in a vacuum oven for 3 days. The product, a colorless optically clear transparent film, was characterized by $^1$H-NMR, Fourier Transform Infrared (FTIR) spectroscopy, and GPC.

The $^1$H-NMR resonances indicate negligible amounts of unreacted diol (i.e., almost complete disappearance of methylene protons adjacent to —OHs between 3.6 and 3.75 ppm). The signals of the diols (HO—S-PIB-S—OH, BG9 and HDO) shifted downfield, which confirms the formation of urethane links. For example, the methylene protons attached to the —OH in HO—S-PIB-S—OH shifted downfield from ~3.7 to 4.2 ppm, and the original splitting pattern which is a doublet of triplets became a simple triplet due to the disappearance of the —OH.

Figure 20:
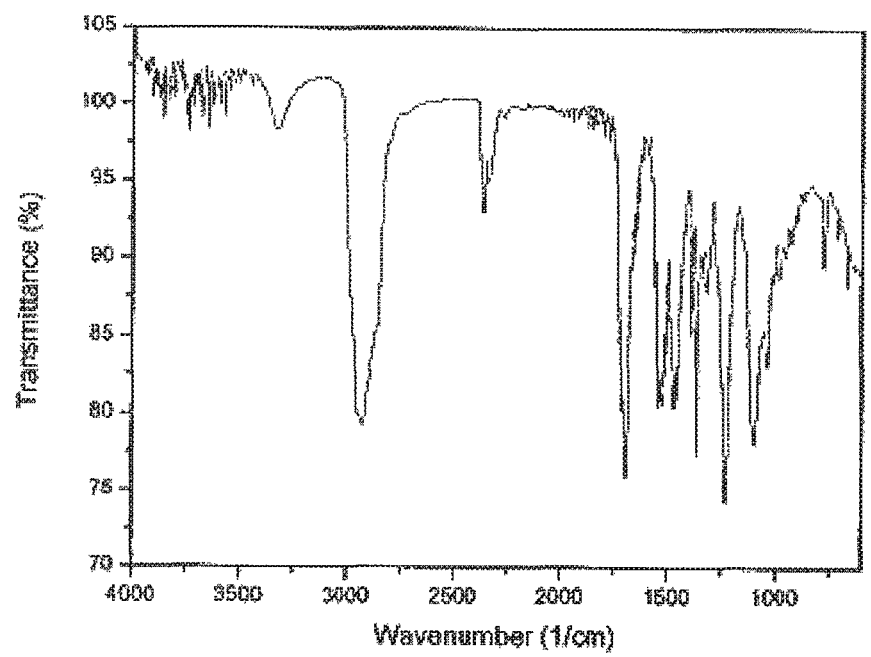
FIG. 20 is a FTIR spectrum of a sulfur containing PIB-based polyurethane according to one or more embodiments of the present invention based on 60 wt % HO—S-PIB-S—OH and HMDI.

The FTIR spectrum shows the almost total disappearance of the strong isocyanate peak at 2270 $cm^{-1}$ and the formation of urethane (N—H) and (C=0) carbonyl peaks around 3300 $cm^{-1}$ and 1700 $cm^{-1}$, respectively (see FIG. 20).

The GPC chromatogram showed monomodal molecular weight distribution with a relatively low PDI (1.30). Furthermore, the GPC peak is symmetric and does not show a shoulder at high molar mass indicating the absence of allophanate formation.

Example 4

The Synthesis of PUs Containing HO—S-PIB-S—OH (70 wt %), HMDI, BG9 and HDO

The HO—S-PIB-S—OH of Example 2 (1.2997 g, 0.389 mmol) and HMDI (0.3771 g, 1.437 mmol) were placed into a 20 ml glass vial, and the system was deoxygenated. THF (3 ml) was injected and the solution was heated to 60° C., then DBTDL catalyst (10 mg, 0.016 mmol-0.2 ml of 50 mg/ml THF solution) was added and the system stirred for 1 hour to obtain the 'prepolymer'. Then a deoxygenated solution of HDO (0.0874 g, 0.740×mmol) and BG9 (0.1075 g, 0.165 mmol) in THF (2 ml) was prepared and injected to the prepolymer solution. The mixture was then stirred for 4.5 h at 60-65° C., and poured into a 7.5×8.5 cm glass mold while it was warm. The solvent was evaporated and the sample was dried at 60° C. in a vacuum oven for 3 days. The product, a colorless transparent film, was characterized by $^1$H-NMR and Fourier Transform Infrared (FTIR) spectroscopy, and GPC.

$^1$H-NMR resonances indicate negligible amounts of unreacted diols (almost complete disappearance of the methylene protons adjacent to —OHs between 3.6 and 3.75 ppm). The signals of all the diols used for the synthesis (HO—S-PIB-S—OH, BG9 and HDO) shifted downfield which confirms the formation of urethane links. For example, the methylene protons attached to the —OH in HO—S-PIB-S—OH shift downfield from ~3.7 to 4.2 ppm and the original splitting pattern (a doublet of triplets) becomes a simple triplet due to the disappearance of —OH.

Figure 21:
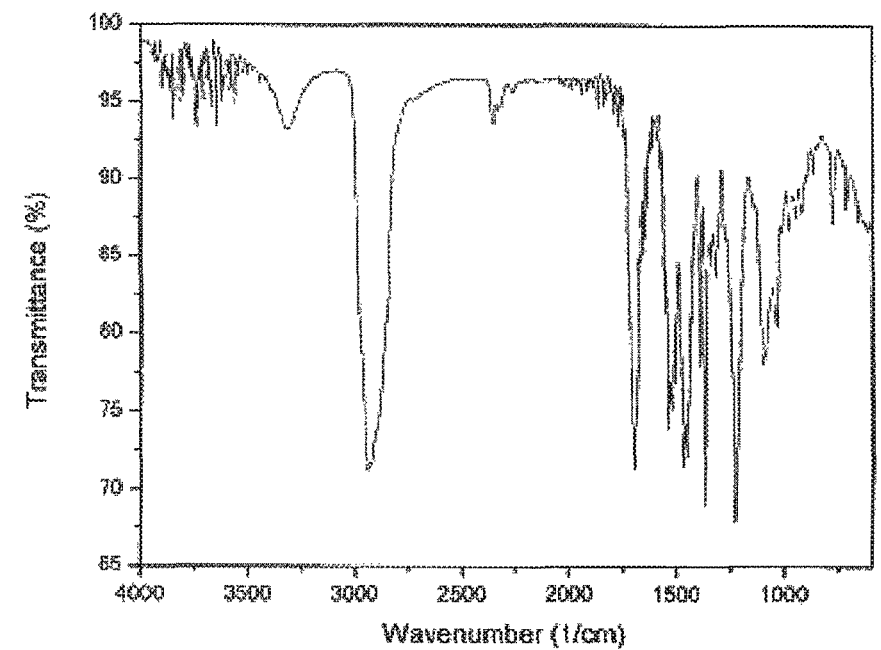
FIG. 21 is a FTIR spectrum of a sulfur containing PIB-based polyurethane according to one or more embodiments of the present invention based on 70 wt % HO—S-PIB-S—OH and HMDI.

The FTIR spectrum shows the almost total disappearance of the strong isocyanate peak at 2270 cm$^{-1}$ and the formation of urethane (N—H) and (C=O) carbonyl peaks around 3300 cm$^n$ and 1700 cm$^{-1}$, respectively (See FIG. 21)

Figure 22:
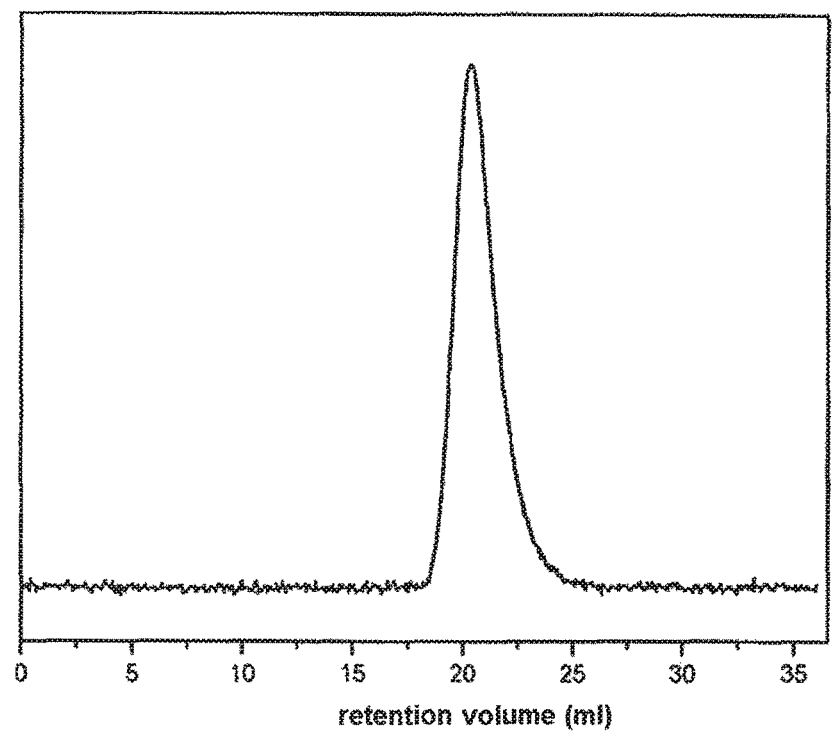
FIG. 22 is a GPC chromatogram of a sulfur containing PIB-based polyurethane according to one or more embodiments of the present invention 70 wt % HO—S-PIB-S—OH and HMDI.

GPC showed monomodal molecular weight distribution with a relatively low PDI (1.25). Furthermore, the GPC peak is symmetrical and does not show a shoulder at high molar mass, which indicates the absence of allophanate groups (See FIG. 22).

Example 5

The Synthesis of PUs Containing HO—S-PIB-S—OH (60 wt %), MDI, BG9 and HDO

The HO—S-PIB-S—OH of Example 2 (1.2718 g, 0.384 mmol) was dissolved in THF (3.5 ml) and injected into a 20 ml round bottom flask that contained distilled 4,4'-Methylenebis(phenyl isocyanate) (MDI) (0.5263 g, 2.01 mmol) and THF (3 ml). The solution was heated to 65° C., then DBTDL catalyst (1.3 mg, 0.0021 mmol-0.26 ml of 5 mg/ml THF solution) was added and the solution was stirred for 30 min to obtain the 'prepolymer'. A solution of HDO (0.1392 g, 1.18 mmol) and BG9 (0.2062 g, 0.317 mmol) in THF (2 mL) was prepared in a separate deoxygenated vial and injected into the prepolymer solution. The mixture was stirred for 5 hours at 65° C., diluted with 4 ml THF and while warm poured into a 7.5×7.5 cm glass mold. The solvent was evaporated and the sample was dried at 60° C. in a vacuum oven for 3 days. A colorless slightly hazy, but transparent film was obtained. The product was characterized by $^1$H-NMR and Fourier Transform Infrared (FTIR) spectroscopy, and GPC.

Figure 23:
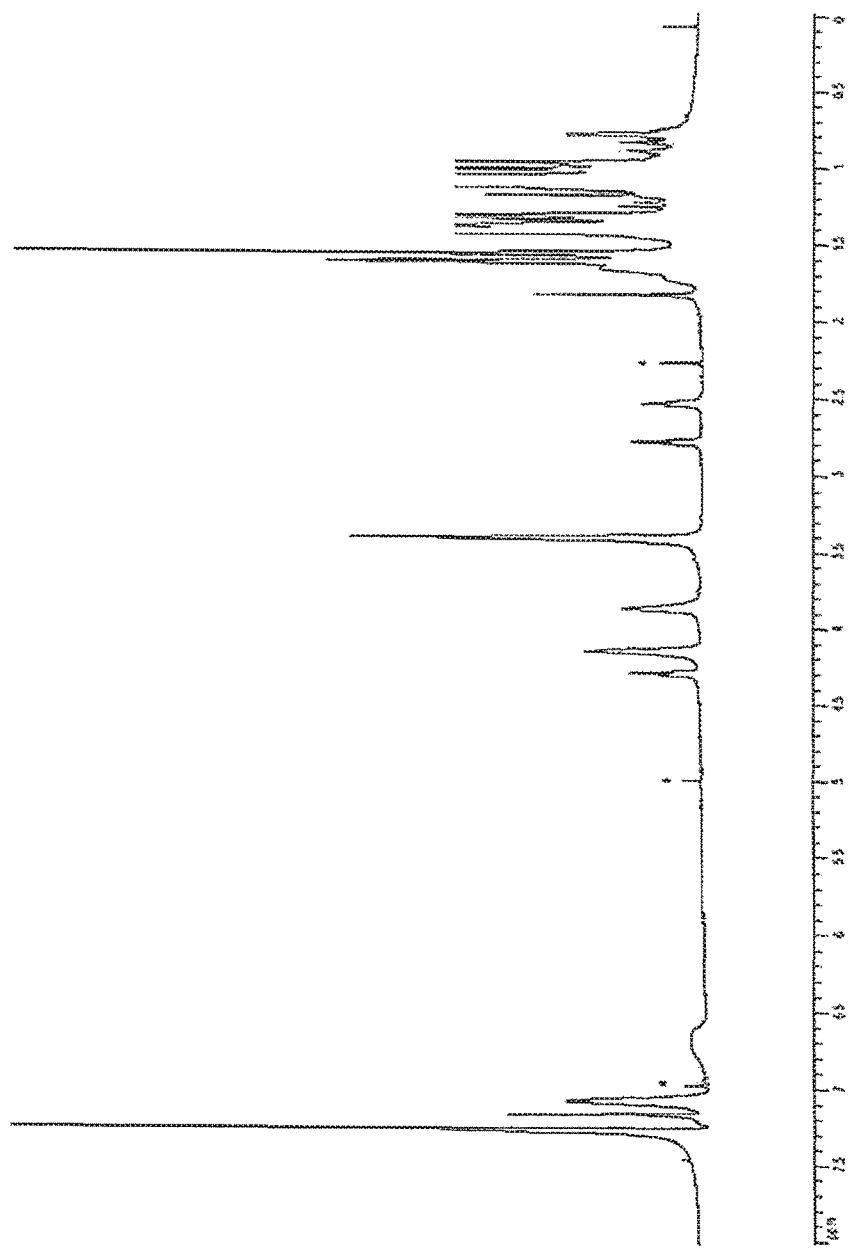
FIG. 23 is a $^1$H-NMR spectrum of a sulfur containing PIB-based polyurethane according to one or more embodiments of the present invention based on 60 wt % HO—S-PIB-S—OH and MDI. BHT is denoted with asterisk.

$^1$H-NMR resonances indicated negligible amounts of unreacted diols (almost complete disappearance of the methylene protons adjacent to —OHs between 3.6 and 3.75 ppm). The signals of all the diols used for the synthesis (OH—S-PIB-S—OH, BG9 and HDO) were shifted downfield, which confirms the formation of urethane links. For example, the methylene protons attached to the —OH in HO—S-PIB-S—OH shift downfield from ~3.7 to 4.3 ppm and the original splitting pattern which is a doublet of triplets becomes a simple triplet due to the disappearance of the —OH (See FIG. 23).

Figure 24:
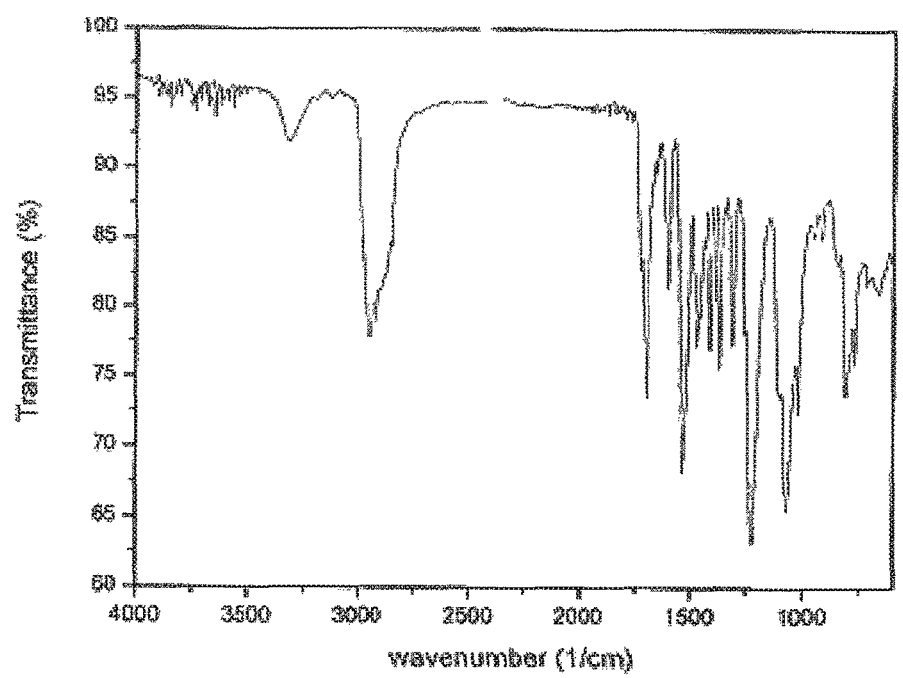
FIG. 24 is a FTIR Spectrum of a sulfur containing PIB-based polyurethane according to one or more embodiments of the present invention based on 60 wt % HO—S-PIB-S—OH and MDI.

The FTIR spectrum shows the disappearance of the strong isocyanate peak at 2270 cm$^{-1}$ and the formation of urethane (N—H) and (C=O) carbonyl peaks around 3300 and 1700 cm$^{-1}$, respectively (See FIG. 24).

GPC showed monomodal molecular weight distribution with a relatively low PDI (1.33). Furthermore, the GPC peak is symmetric and does not show a shoulder at high molar mass indicating the absence of allophanate groups.

Example 6

The Synthesis of PUs Containing HO—S-PIB-S—OH (70 wt %), MDI, BG9, and HDO

The HO—S-PIB-S—OH of Example 2 (1.3174 g, 0.397 mmol) was dissolved in THF (3 ml) and injected into a 20 ml round bottom flask containing distilled MDI (0.3803 g, 1.450 mmol) and THF (3 ml). The solution was heated to 65° C., then DBTDL catalyst (10 mg, 0.016 mmol-0.2 ml of 5 mg/ml THF solution) was added, and the solution was stirred for 30 min to obtain the 'prepolymer'. A deoxygenated solution of HDO (0.0918 g, 0.777 mmol) and BG9 (0.1198 g, 0.184 mmol) in THF (2 mL) was prepared and injected into the prepolymer solution. The mixture was diluted with 2 ml THF, stirred for 5 h at 65° C., and while warm was poured into a 7.5×8.5 cm glass mold. The solvent was evaporated and the sample dried at 60° C. in a vacuum oven for 3 days. The product, a colorless transparent film, was characterized by $^1$H-NMR and Fourier Transform Infrared (FTIR) spectroscopy, and GPC.

$^1$H-NMR resonances indicate the absence of unreacted diols (disappearance of the methylene protons adjacent to —OHs between 3.6 and 3.75 ppm). The signals of the diols used for the synthesis (OH—S-PIB-S—OH, BG9 and HDO) shifted downfield which confirms the formation of urethane links. For example, the methylene protons attached to the —OH in HO—S-PIB-S—OH shift downfield from ~3.7 to 4.3 ppm, and the original splitting pattern of a doublet of triplets becomes a simple triplet due to the disappearance of —OH.

Figure 25:
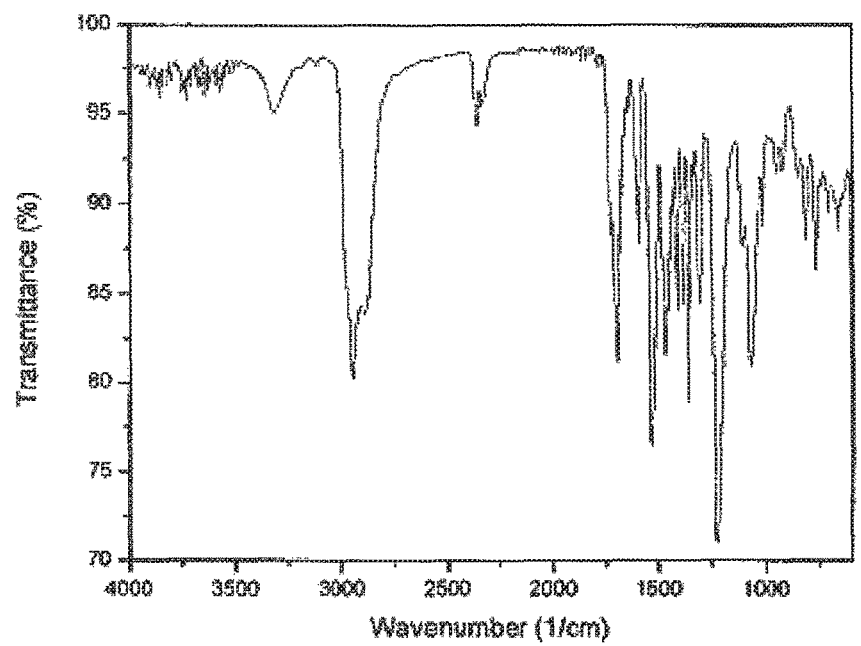
FIG. 25 is a FTIR spectrum of a sulfur containing PIB-based polyurethane according to one or more embodiments of the present invention based on 70 wt % HO—S-PIB-S—OH and MDI.

The FTIR spectrum shows the disappearance of the strong isocyanate peak at 2270 cm$^{-1}$ and the formation of urethane (N—H) and (C=O) carbonyl peaks around 3300 cm$^{-1}$ and 1700 cm$^{-1}$, respectively (See FIG. 25).

Figure 26:
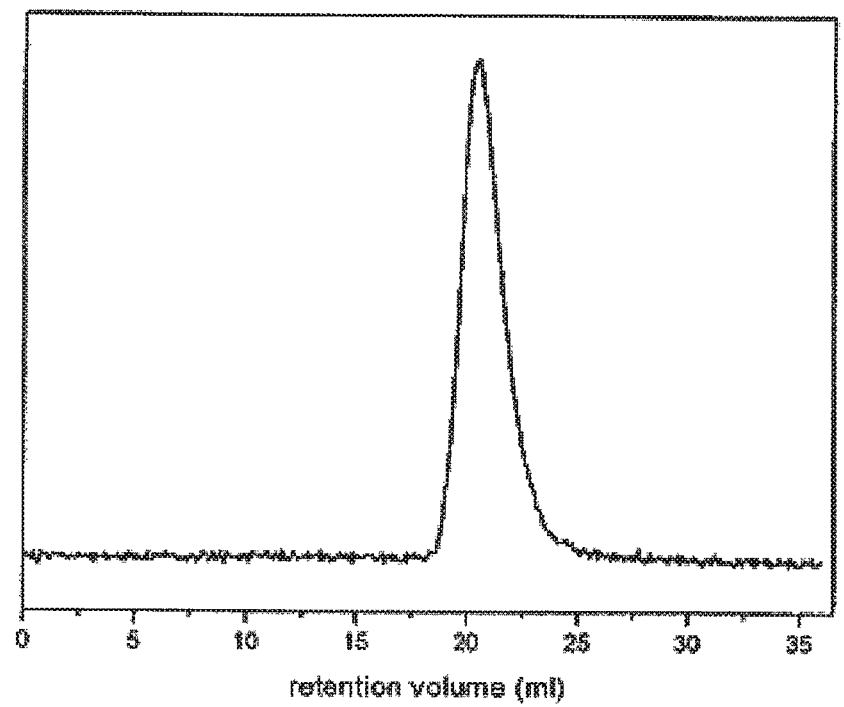
FIG. 26 is a GPC chromatogram of a sulfur containing PIB-based polyurethane according to one or more embodiments of the present invention based on 70 wt % HO—S-PIB-S—OH and MDI.

GPC showed monomodal molecular weight distribution with a relatively low PDI (1.27). The GPC peak is symmetrical and does not show a shoulder at high molar mass indicating the absence of allophanate groups (See FIG. 26).

For comparison, the procedures were repeated with OH-PIB-OH (i.e., PIB-based PUs that did not contain sulfur) See Tables 2, 5, above.

Although the present invention has been described in considerable detail with reference to certain embodiments, other embodiments are possible. Therefore, the spirit and

Example 7

Synthesis of 72.5% PIB$_S$-PU

A representative two step synthesis was carried out as follows: HO—S-PIB-S—OH (6.005 g, 1.888 mmol) was dissolved in THF (14 mL) and injected in a 100 mL round bottom flask containing freshly distilled MDI (1.9139 g, 7.648 mmol) dissolved in THF (4 mL) under a N$_2$ blanket. The prepolymer was prepared by heating the system to 65° C., adding dibutyltin dilaurate (DBTDL) catalyst (4.8 mg, 0.0076 mmol-0.48 mL of 10 mg/mL THF solution) and stirring 1 h. In a separate deoxygenated vial a solution of BDO (0.4809 g, 5.3362 mmol) in THF (4 mL) was prepared and injected in the prepolymer solution. The system was stirred 3 h at 65° C. and poured in a 14×14 cm glass mold. The product was air dried approximately 16 hours and further dried in a vacuum oven (1 mm Hg) 1 day at 60° C. A colorless optically clear rubbery film was obtained.

Select samples were annealed in a vacuum oven for 14-18 hours at 100° C.

Example 8

HO—S-PIB-S—OH Oxidation by KMnO$_4$

OH—S-PIB-S—OH (0.228 g, 0.0675 mmol), KMnO$_4$ (0.0467 g, 0.2955 mmol), acetic acid (approximately 3 Drops), H$_2$O (2 mL) and DCM (3 mL) were placed in a 50 mL round bottom flask and stirred vigorously for 2 days at room temperature. Then, the solvent was evaporated, the crude mixture dissolved in hexane, washed twice with brine and water, dried over MgSO$_4$, filtered, and the any remaining solvent was evaporated. A colorless, transparent oil was obtained.

Oxidation did not occur in the absence of acetic acid (phase transfer catalyst).

Although the present invention has been described in considerable detail with reference to certain embodiments, other embodiments are possible. Therefore, the spirit and scope of the appended claims should not be limited to the description of the embodiments contained herein.

What is claimed is:

1. A sulfur containing polyurethane comprising a residue of a sulfur containing, hydroxyl telechelic polyisobutylene and wherein the sulfur atom of the residue of the sulfur containing, hydroxyl telechelic polyisobutylene is separated from a terminal hydroxyl group of the sulfur containing polyisobutylene by two carbon atoms and wherein the sulfur containing polyurethane has the formula:

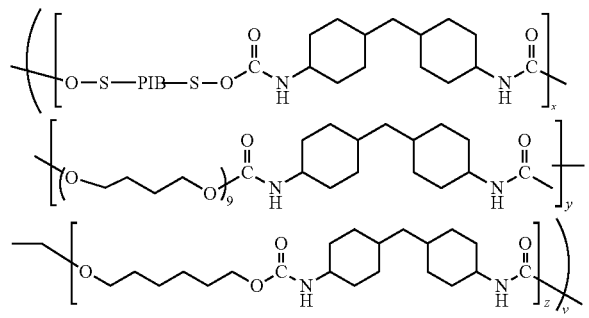

or

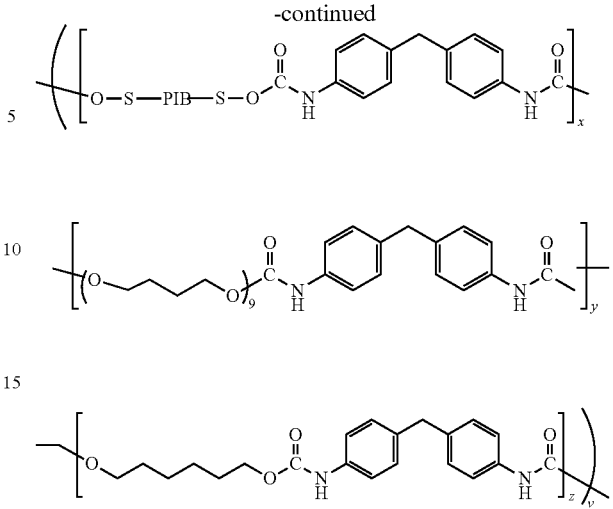

wherein x is an integer from about 5 to about 100; y is an integer from about 5 to about 100; z is an integer from about 5 to about 100; v is an integer from about 5 to about 100.

2. The sulfur containing polyurethane of claim 1 wherein the S-C bonds in the backbone of the polymer are not susceptible to hydrolysis by acids.

3. The sulfur containing polyurethane of claim 1 wherein the residue of the sulfur containing, hydroxyl telechelic polyisobutylenes comprise from about 50 weight % to about 80 weight % of said sulfur containing polyurethane.

4. The sulfur containing polyurethane of claim 1 having a polydispersity (PDI) of from about 3.0 to about 1.1.

5. The sulfur containing polyurethane of claim 1 having a tensile strength of from about 0.5 MPa to about 40 MPa.

6. The sulfur containing polyurethane of claim 1 having a tensile elongation of from about 50% to about 500%.

7. The sulfur containing polyurethane of claim 1 having increased creep resistance relative to the corresponding PIB$_O$—PU polymer.

8. The sulfur containing polyurethane of claim 1 wherein said sulfur containing polymer is annealed.

9. A method of making a sulfur containing polyisobutylene-based polyurethane comprising:

A. preparing a sulfur containing, hydroxyl telechelic polyisobutylene wherein the sulfur atom of the sulfur containing, hydroxyl telechelic polyisobutylene is separated from a terminal hydroxyl group of the sulfur containing polyisobutylene by two carbon atoms;

B. combining said sulfur containing, hydroxyl telechelic polyisobutylene, an isocyanate and a suitable solvent in a suitable container under an inert atmosphere and heating the combination to a temperature of from about 50° C. to about 70° C.;

C. adding a catalyst and stirring to produce a prepolymer comprising the residues of said the sulfur containing, hydroxyl telechelic polyisobutylene and said isocyanate, said prepolymer having isocyanate end groups;

D. dissolving one or more chain extender in a suitable deoxygenated solvent and adding it to the prepolymer solution of step C; and E. reacting said prepolymer with said chain extender to produce a sulfur containing polyisobutylene-based polyurethane having the formula:

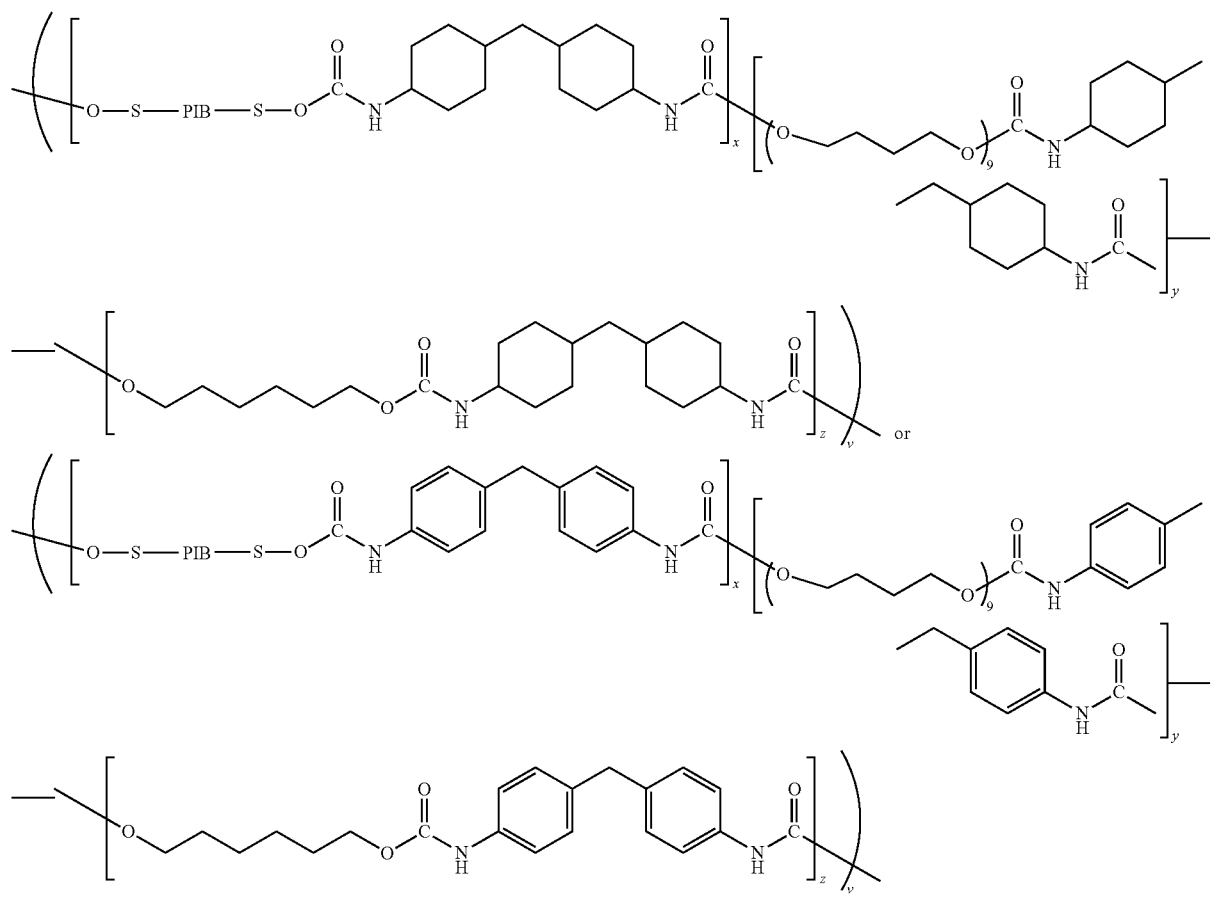

wherein x is an integer from about 5 to about 100; y is an integer from about 5 to about 100; z is an integer from about 5 to about 100; v is an integer from about 5 to about 100.

10. The method of claim 9 wherein the step of preparing comprises:
F. producing a polyisobutylene having one or more unsaturated end groups;
G. combining said polyisobutylene with 2-mercaptoethanol and a photoinitiator; and
H. exposing the combination of step G to ultra-violet light to produce a sulfur containing hydroxyl-telechelic polyisobutylene.

11. The method of claim 9 wherein said isocyanate is selected from the group consisting of 4,4'-methylenebis (phenyl isocyanate) (MDI), 4,4'-methylenebis(cyclohexyl isocyanate) (HMDI), and combinations thereof.

12. The method of claim 9 wherein said catalyst comprises dibutyltin dilaurate.

13. The method of claim 9 further comprising the step of annealing said sulfur containing polyisobutylene-based polyurethane.

* * * * *